United States Patent [19]
Bartholomew et al.

[11] Patent Number: 6,136,118
[45] Date of Patent: Oct. 24, 2000

[54] ULTRASONIC TYING TOOL

[75] Inventors: Paul J. Bartholomew, Memphis; John J. Students, Collierville, both of Tenn.; Gary L. Lowery, Southaven, Miss.; Wasim Khokhar, Cordova, Tenn.; Mark A. Bailey, Senatobia; John D. Dorian, Olive Branch, both of Miss.; John A. Sehlmeyer, Mount Sinai, N.Y.; Peter M. Wells, Jr., Germantown, Tenn.

[73] Assignee: Thomas & Betts International, Inc., Sparks, Nev.

[21] Appl. No.: 09/133,495

[22] Filed: Aug. 12, 1998

Related U.S. Application Data

[63] Continuation-in-part of application No. 09/036,188, Mar. 6, 1998, abandoned.
[60] Provisional application No. 60/055,593, Aug. 12, 1997.

[51] Int. Cl.$^7$ .................................................... B65B 13/32
[52] U.S. Cl. .......................... 156/73.1; 156/229; 156/267; 156/495; 156/530; 156/580.1; 156/580.2; 100/33 PB
[58] Field of Search .................................. 156/73.1, 73.3, 156/229, 267, 494, 495, 510, 515, 530, 580.1, 580.2; 100/29, 32, 33 PB

[56] References Cited

U.S. PATENT DOCUMENTS

| | | | |
|---|---|---|---|
| 3,943,608 | 3/1976 | Farkas | 24/16 |
| 4,265,687 | 5/1981 | Mercer et al. | 156/73.1 |
| 4,534,817 | 8/1985 | O'Sullivan | 156/352 |
| 4,842,671 | 6/1989 | Nuss | 156/433 |
| 5,062,920 | 11/1991 | Horikx et al. | 156/380.4 |
| 5,275,674 | 1/1994 | Sayyadi | 156/73.1 |
| 5,380,395 | 1/1995 | Uchida | 156/577 |
| 5,425,826 | 6/1995 | Sayyadi et al. | 156/73.1 |
| 5,509,994 | 4/1996 | Recchia et al. | 156/468 |
| 5,573,627 | 11/1996 | Vuong | 156/392 |

*Primary Examiner*—James Sells
*Attorney, Agent, or Firm*—Hoffmann & Baron, LLP

[57] ABSTRACT

An ultrasonic tying tool for installation of a tape about a bundle of elongate articles. The tool includes an ultrasonic horn wherein the welding tip is moveable between a first position for welding of a tape to secure the tensioned loop about the plurality of articles and a second position wherein the welding tip is translated a distance from the first position to effect cutting of the tensioned loop from the stock of tape and to tack weld the loose cut end to the underlying tape of the loop to eliminate any protruding sharp edges. The tool additionally includes a belt drive mechanism for advancing the tape to the jaw assembly and for tensioning the tape following looping of the tape about the outside.

51 Claims, 32 Drawing Sheets

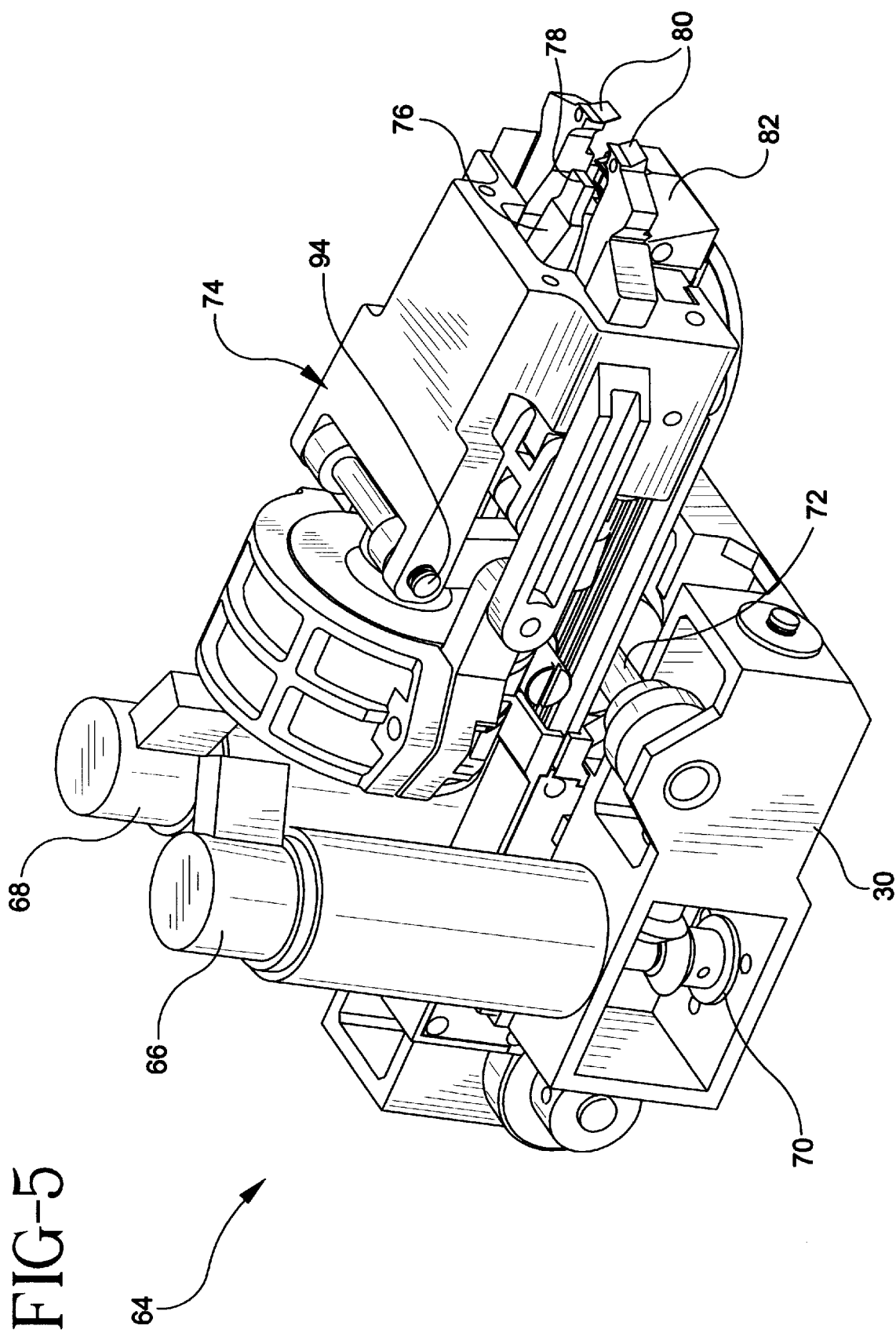

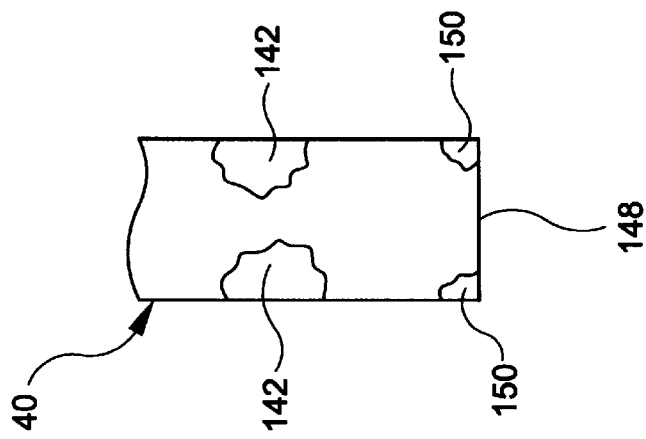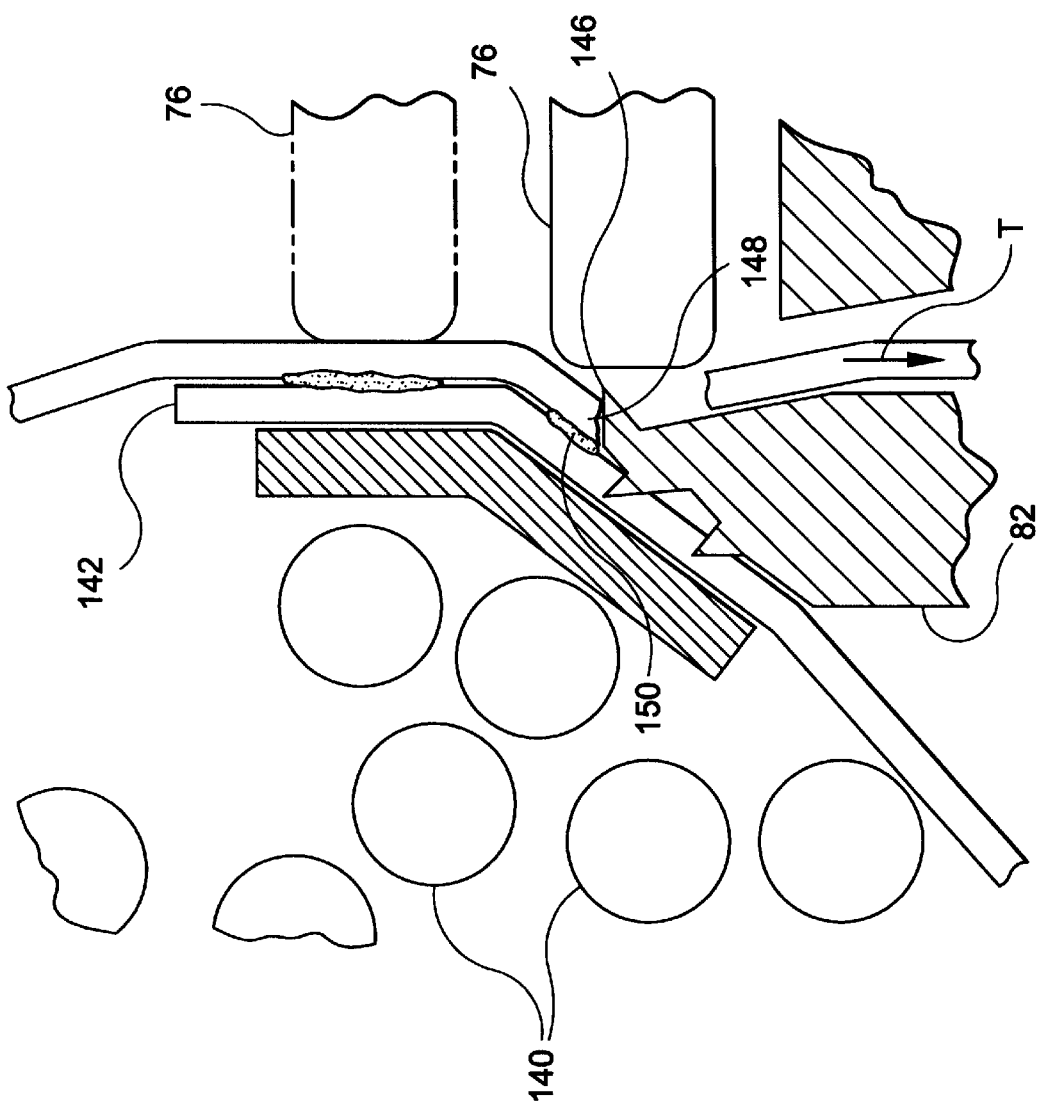

ULTRASONIC TYING TOOL

This application is a continuation-in-part of U.S. application Ser. No. 09/036,188 filed Mar. 6, 1998 now abandoned. This application also claims priority to U.S. Provisional Application No. 60/055,593 filed Aug. 12, 1997.

BACKGROUND OF THE INVENTION

The present invention relates to a tool for applying a weldable tape about a bundle of elongate articles and, more particularly, to an improved tool and method for securing the tape about the articles without loss of tension in the tape and without leaving an unsecured loose end or a protruding sharp edge adjacent the weld.

Various techniques exist for bundling elongate articles such as wires, cables or the like. One preferred technique for bundling a plurality of elongate articles involves the feeding of a weldable tape about the bundled articles until the tape overlaps itself, tensioning the tape about the bundle of articles and thereafter welding the tape at the location of the overlap to provide a tensioned loop which secures the bundle of articles. The tensioned loop is then cut free from the remaining stock of tape so that the tool can be removed from the first bundle of articles and moved to a second location to secure a second portion of tape about a second bundle of articles.

The prior art tools accomplish the welding and cutting operations in various ways, all of which have disadvantages. Certain prior art tools are disclosed in U.S. Pat. Nos. 4,265,687, 4,534,817, 5,062,920 and 5,509,994. A first group of prior art tools are configured to both weld and cut the tape at the same location. This technique often results in loosening of the tape about the bundle of articles (i.e., loss of tension) because the cutting portion of the bundling operation may adversely effect and/or weaken the ultrasonic weld which has been previously applied to the tape. Weakening of the weld thus allows the tape to stretch and lose its tension about the bundle of articles. A second group of prior art tools locate the cutting element a distance from the weld location so as not to weaken the weld. These tools, however, leave a loose end of tape adjacent the weld following the cutting operation which is undesirable (and many times unacceptable) in various installations. Certain other prior art tools rely on a technique whereby a portion of the tape is weakened during the welding operation such that the application of tension to the tape following the welding operation severs the tensioned loop tape from the stock of tape. However, the repeatability of such a technique is often inconsistent and, the technique often leaves a ragged loose end adjacent the weld.

There is therefore a need in the art for a tieing tool which can readily bundle a plurality of elongate articles by applying a weldable tape thereabout, tensioning such tape, welding the tensioned loop at the location of the overlap and thereafter severing the welded tensioned loop from the stock of tape without weakening the weld (which allows loss of tension in the bundle of articles) or leaving an unsecured loose end or a protruding sharp edge adjacent the weld which is undesirable and/or unacceptable in various installations.

An additional shortcoming associated with prior art tools is the inability of such tools to both properly feed the tape to the jaws of the tool without jamming and to adequately tension the tape prior to welding. In this regard, prior art tools often experience tape slippage during the tensioning stage of the bundling operation. This is, the tape drive mechanism loses its grip on the tape prior to the proper level of tensioning being achieved in the tape. There is therefore a need in the art for a tieing tool which additionally provides adequate tensioning of the weldable tape during the tensioning stage of the bundling operation, while also providing reliable and efficient tape transfer during the tape advancement stage of the bundling operation.

SUMMARY OF THE INVENTION

The present invention, which addresses the need to the prior art, relates to an ultrasonic tieing tool for applying a weldable tape about a bundle of elongate articles. The tool includes a housing having a body and a handle. The tool further includes a jaw assembly cooperating with the body and configured to grasp the elongate articles whereby the tape may be looped about the articles. The tool further includes and ultrasonic horn supported within the body and including a welding tip located proximate the jaw assembly. The tool additionally includes at least one anvil located to cooperate with the welding tip and adapted for manipulating a portion of the weldable tape bearing thereagainst. Finally, the welding tip is displaceable between a first location wherein the welding tip is positioned to weld the tape thus securing the tape about the elongate articles and a second location wherein the welding tip is displaced a distance from the first location and positioned to effect cutting of the tape and tack welding of the resultant cut end to the underlying tape of the loop.

The present invention further relates to a method for bundling a plurality of elongate articles. The method includes the step of wrapping a weldable tape having a first free end about the articles to form a loop of tape extending around the articles and beyond the first free end thereby providing an overlap of tape. The method includes the further step of welding the overlapped tape at a first location along the overlap. The method includes the additional step of cutting the tape at a second location along the overlap to provide a second distal end. Finally, the method includes the step of welding the second distal end to the underlying tape of the loop.

In one preferred embodiment, the method of bundling the plurality of elongate article may be accomplished by providing an ultrasonic welding tip for ultrasonically welding the overlapped tape at the first location along the overlap and thereafter displacing the welding tip to a second location along the overlap to effect the cutting of the tensioned loop from the stock of tape and welding of the cut end to the underlying tape of the loop.

The present invention also relates to an ultrasonic tieing tool for applying a weldable tape about a bundle of elongate articles. The tool includes a housing having a body and a handle. The tool further includes a jaw assembly cooperating with the body and configured to grasp the elongate articles whereby the tape may be looped about the articles. The tool also includes an ultrasonic horn supported within the body and including a welding tip located proximate the jaw assembly. The tool additionally includes at least one anvil located to cooperate with the welding tip and adapted for manipulating a portion of the weldable tape bearing thereagainst. Finally, the tool includes a belt drive mechanism for advancing the tape to the jaw assembly and for tensioning the tape following looping of the tape about the articles. The mechanism include a drive belt and a drive housing surrounding at least a portion of the belt, the drive housing defines at least one guide channel for passage of the tape therethrough. The belt defines at least one wall of the passage. Finally, the passage is dimensioned to resist out-of-plane buckling of the tape as the tape is advanced therethrough.

The present invention further relates to an ultrasonic tieing tool for applying a weldable tape about a bundle of elongate articles. The tool includes a housing having a body and a handle. The tool further includes a jaw assembly cooperating with the body and configured to grasp the elongate articles whereby the tape may be looped about the articles. The tool also includes an ultrasonic horn supported within the body and including a welding tip located proximate the jaw assembly. The tool additionally includes at least one anvil located to cooperate with the welding tip and adapted for manipulating a portion of the weldable tape bearing thereagainst. The tool further includes a tape drive mechanism for advancing the tape to the jaw assembly and for tensioning the tape following looping of the tape about the articles. The jaw assembly includes at least one moveable jaw. The tool also includes a trigger operatively connected to the movable jaw. The trigger is mounted on the handle and moveable between a standby position and an actuated position. The tool further includes a control linkage movably mounted with respect to the tool housing and movable between a first position and a second position. The tool also includes first and second control rods having first and second ends respectively. The first rod extends between the trigger and the linkage whereby movement of the trigger from the standby position to the actuated position causes the first rod to pivot the linkage from the first position to the second position. The second rod extends between the linkage and the movable jaw whereby pivoting of the linkage from the first position to the second position causes the second rod to move the movable jaw from an open position to a closed position. The linkage is biased to the first position. The tool further includes a locking mechanism for holding the linkage in the second position following actuation of the trigger. The tool additionally includes a releasing mechanism for releasing the locking mechanism following welding of the tape about the articles whereby the linkage pivots to the first position causing the second rod to move the movable jaw to the open position.

The present invention also relates to an ultrasonic tieing tool for applying a weldable tape about a bundle of elongate articles. The tool includes a housing having a body and a handle. The tool further includes a jaw assembly cooperating with the body and configured to grasp the elongate articles whereby the tape may be looped about the articles. The tool further also an ultrasonic horn supported within the body and including a welding tip located proximate the jaw assembly. The tool additionally includes at least one anvil located to cooperate with the welding tip and adapted for manipulating a portion of the weldable tape bearing thereagainst. Finally, the tool includes a tape drive mechanism for advancing the tape to the jaw assembly and for tensioning the tape following looping of the tape about the articles. The mechanism includes a drive wheel and a cooperating spring loaded pad for gripping the tape extending therebetween. The pad is pivotable between a tape feeding position and a tape tensioning position. Finally, the pad is configured to pivot to the tape tensioning position upon increase of tension in the tape.

Finally, the present invention relates to an ultrasonic tieing tool for applying a weldable tape about a bundle of elongate articles. The tool includes a housing having a body and a handle. The tool further includes a jaw assembly cooperating with the body and configured to grasp the elongate articles whereby the tape may be looped about the articles. The tool also includes an ultrasonic horn supported within the body and including a welding tip located proximate the jaw assembly. The tool additionally includes at least one anvil located to cooperate with the welding tip and adapted for manipulating a portion of the weldable tape bearing thereagainst. Finally, the tool includes a belt drive mechanism for advancing the tape to the jaw assembly and for tensioning the tape following looping of the tape about the articles. The mechanism includes a pair of cooperating wheels for advancement of the tape therebetween. Each of the wheels is directly driven by the tool whereby increased gripping of the tape by the wheels is accomplished.

As a result, the present invention provides an ultrasonic tieing tool which can readily bundle a plurality of elongate articles by applying a weldable tape thereabout, tensioning such tape, welding the tensioned loop at the location of the overlap and thereafter severing the welded tensioned loop from the stock of tape without weakening the weld (which allows loss of tension in the bundle of articles) or leaving an unsecured loose end or a protruding sharp edge adjacent the weld. The present invention further provides an ultrasonic tieing tool which provides adequate tensioning of the tape without tape slippage during the tensioning stage of the bundling operation, while also providing reliable and efficient tape transfer during the tape advancement stage of the bundling operation.

BRIEF DESCRIPTION OF THE DRAWINGS

FIG. 5 is a perspective view of a tool subassembly removed from the housing;

FIG. 11 is an enlarged detail showing the welded tensioned loop cut free from the stock of tape;

FIG. 12 is an enlarged detail of the welded distal end of the tape;

DETAILED DESCRIPTION OF THE INVENTION

Figure 1:
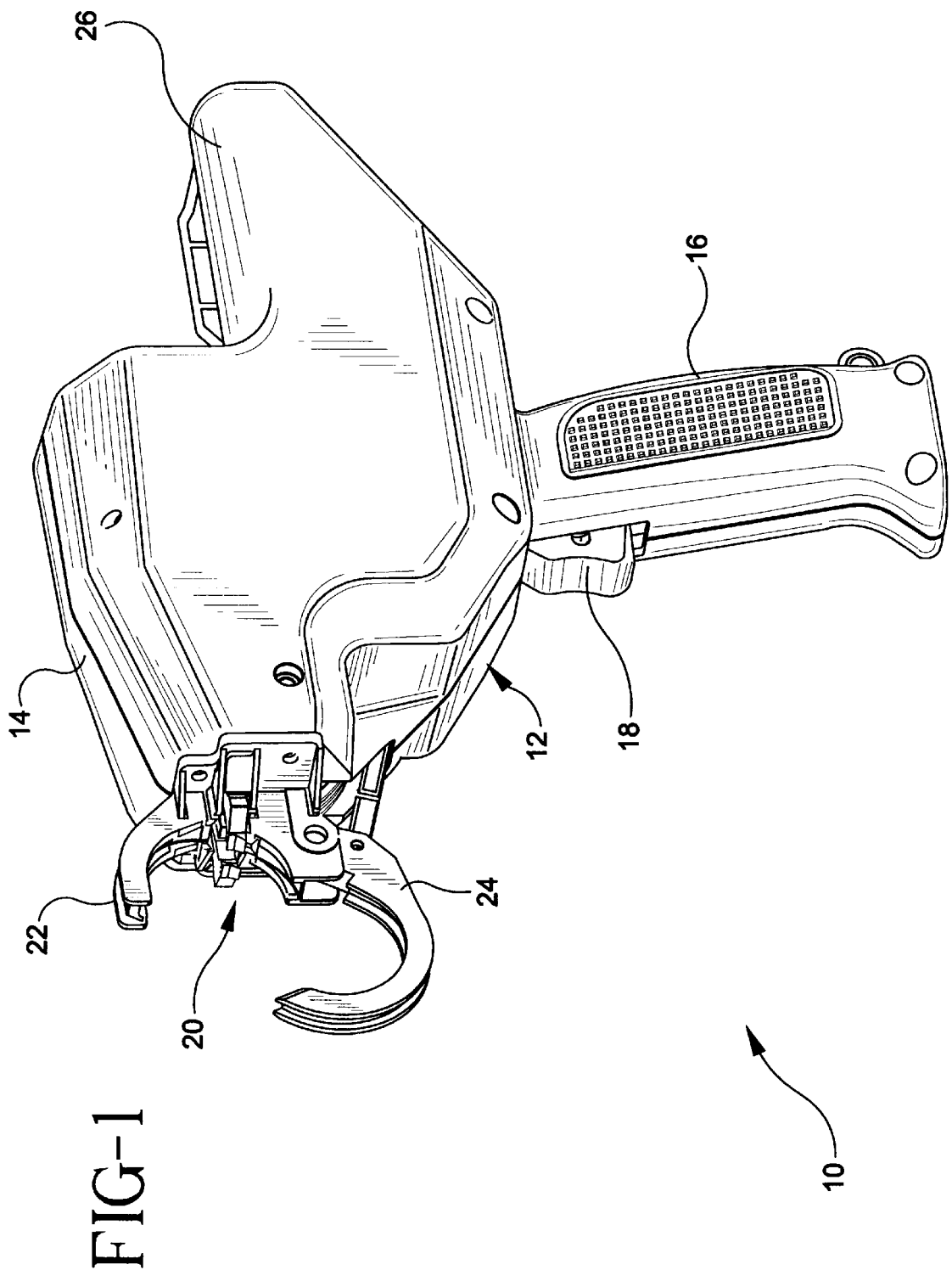
FIG. 1 is a perspective view of the tool of the present invention.

Referring now to the drawings, FIG. 1 shows an ultrasonic tieing tool 10 in accordance with the present invention. Tool 10 includes a generally pistol-shaped housing 12, the housing including a body 14 and a handle 16. A trigger 18, for operating the tool, is provided on handle 16. A jaw assembly 20 is provided on a forward end of tool 10. Jaw assembly 20 includes an upper stationary jaw 22 and a lower movable jaw 24. The rear portion of body 14 includes a cartridge mounting interface 26 and a drive/guide wheel 28 rotatably mounted to housing 12.

Figure 2:
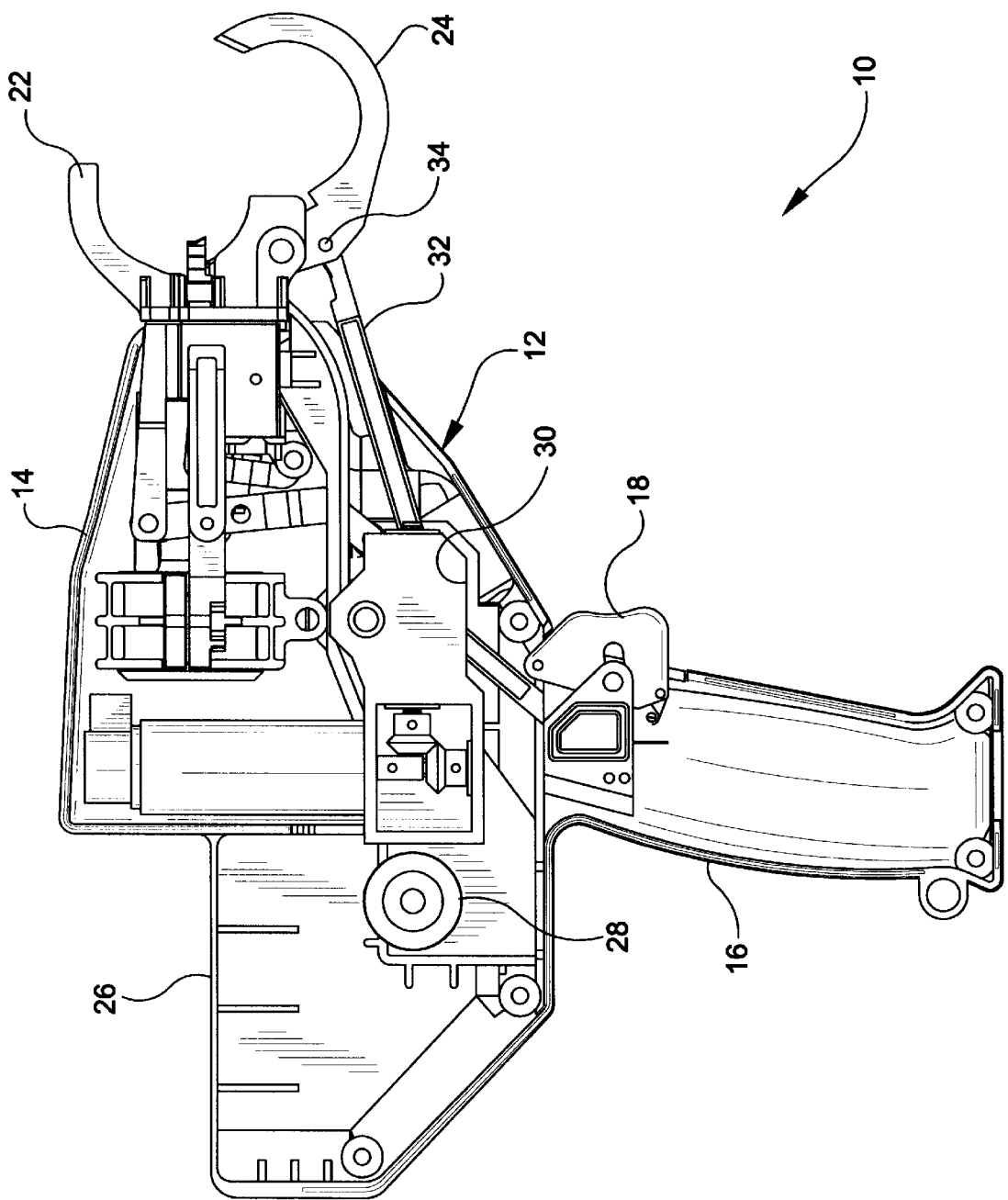
FIG. 2 is an elevational view of the tool of FIG. 1 with a portion of the housing removed.

As best seen in FIG. 2, tool 10 includes a mounting platformn 30 for supporting a number of tool components (as discussed further hereinbelow). Mounting platform 30, in turn, cooperates with housing 12 to allow assembly of the tool components therein. In this regard, housing 12 is preferably formed with a platform-receiving structure which receives and secures platform 30 within such housing.

Tool 10 further includes a jaw-actuating rod assembly 32 for moving lower movable jaw 24 between an open position to allow insertion of a bundle of elongate articles therein and a closed position for securement of a weldable tape thereabout. A first end of rod assembly 32 is pivotably connected to jaw 24 via pin 34, while the other end of the rod assembly (not shown) communicates with a link (not shown), which in turn communicates with trigger 18. Thus, squeezing of trigger 18 closes jaw 24, while release of trigger 18 opens jaw 24.

Squeezing of trigger 18 also operates a switch (not shown) electrically communicating with a control mechanism (not shown). As will be recognized by those skilled in the art, the control mechanism may, for example, include a programmed microchip contained internally within the tool or external to the tool (e.g., the microchip and power supply could be combined together into one unit). The control mechanism provides power and or instructions to the components of the tool at the appropriate points during the bundling operation.

Figure 3:
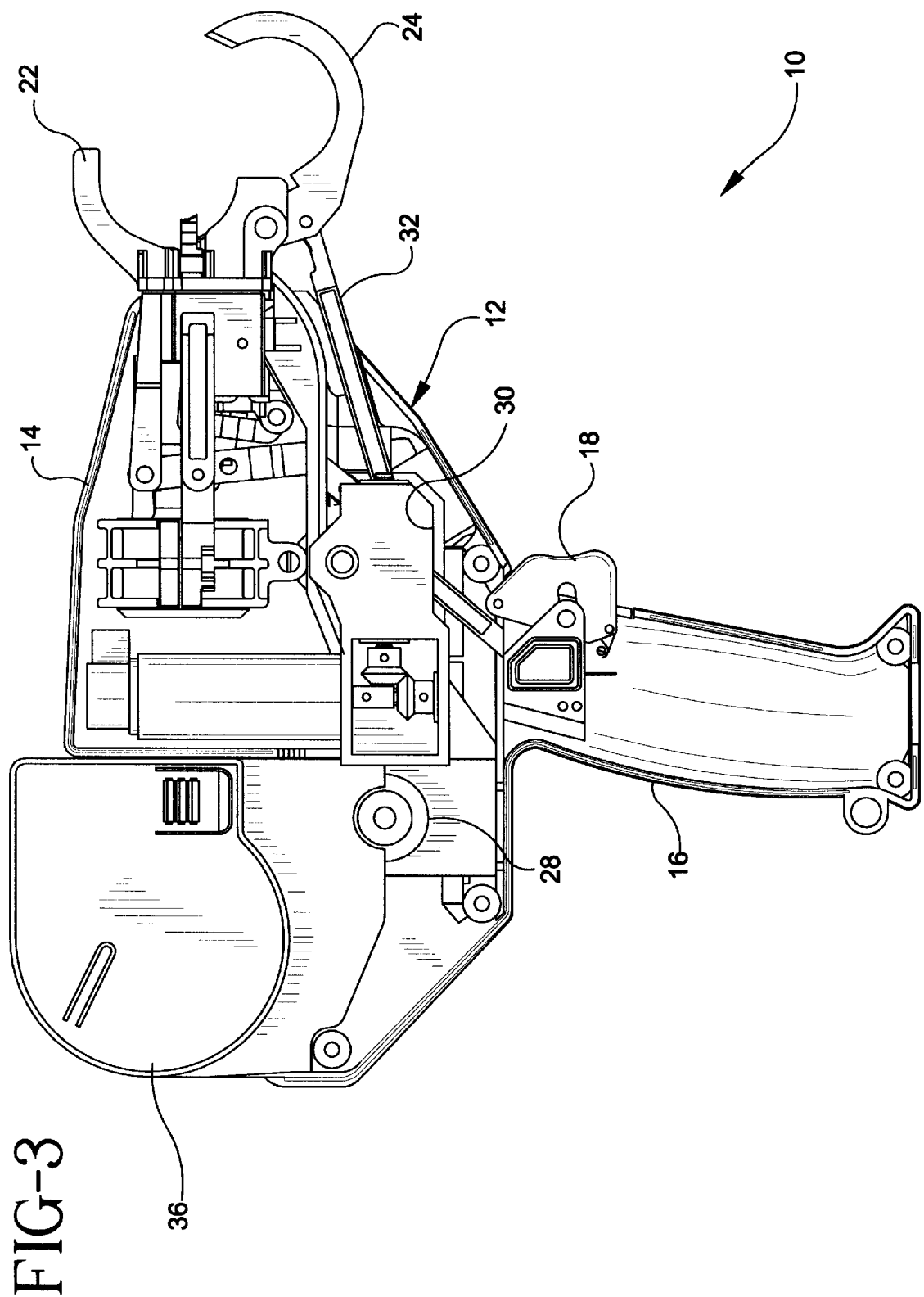
FIG. 3 is a view similar to FIG. 2 showing a tape-supplying cartridge secured to a rearward portion of the tool.

Referring now to FIG. 3, tool 10 is configured to receive and cooperate with a tape-supplying cartridge 36. In one preferred embodiment, cartridge 36 is sized and configured to cooperate with and mount to cartridge-mounting interface 26 of housing 12. As will be discussed in more detail hereinbelow, cartridge 36 contains a fixed length of tape wound on a spool. The preferred cartridge has various features which ensure reliable feeding of the tape from the spool to the ultrasonic tieing tool. The cartridge is preferably designed as a disposable item such that the cartridge is discarded once all the tape contained therein has been used. In this regard, the cartridge is preferably formed of a two-piece molded plastic housing, the halves of the housing being bonded together in a press-fit assembly. Air vents may be provided in the molded portions of the cartridge housing to allow air to escape during the press-fit operation. As the cartridge is designed to be disposable, once the cartridge housing has been assembled, re-opening of the same destroys such housing. The disposable design of cartridge 36 thus ensures that quality control with respect to the tape supply can be maintained.

Figure 4:
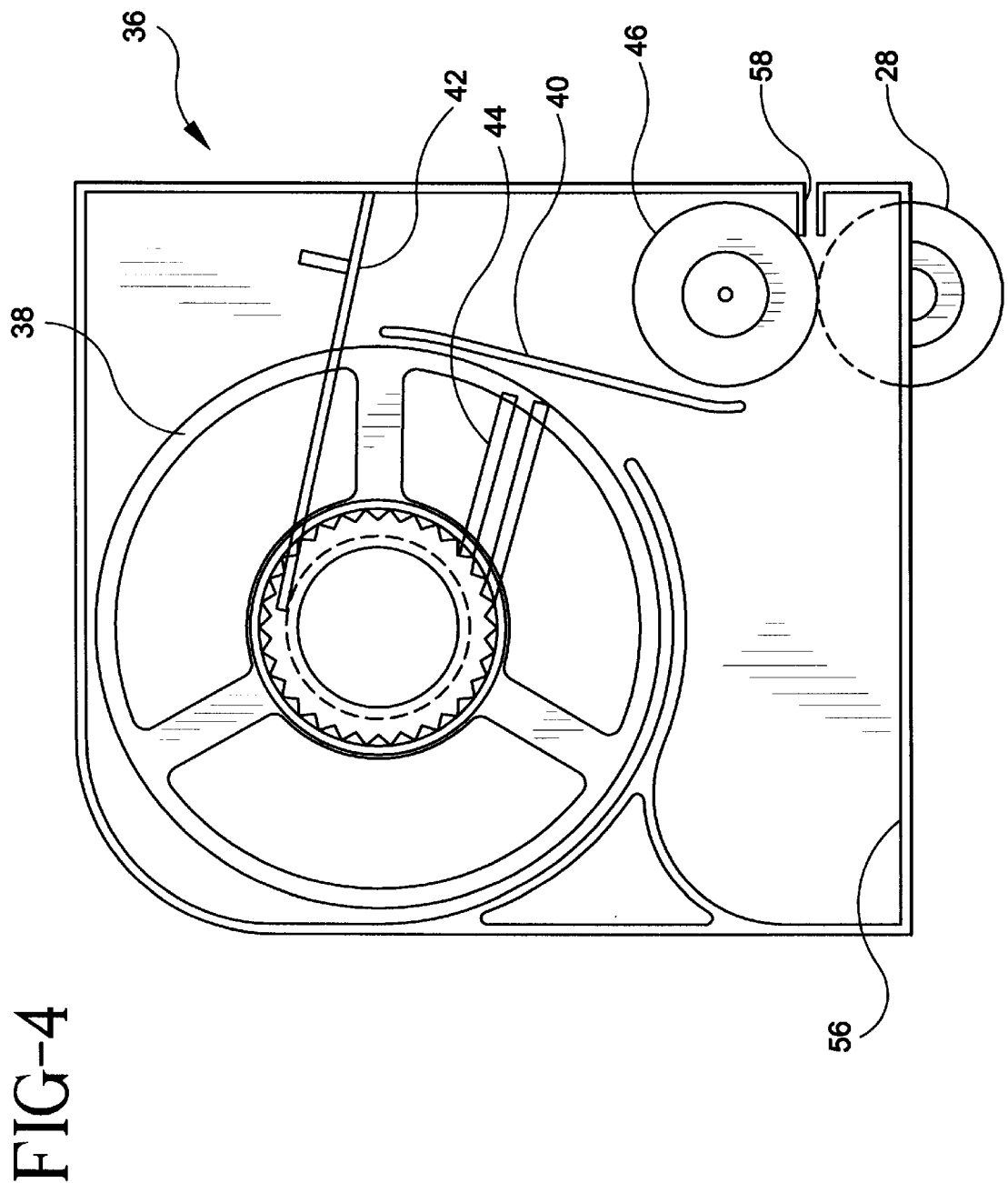
FIG. 4 is an enlarged detail of the tape-supplying cartridge of FIG. 3.

As best shown in FIG. 4, cartridge 36 includes a spool 38 for winding of a weldable tape 40 thereabout. Tape 40 may be formed from any suitable weldable material, e.g., polyester. A spring 42 ensures that the tape remains coiled tightly about the spool. A ratchet mechanism 44 limits rotation of the spool to a single direction, thus preventing loosening and or unwinding of the tape from the spool. The cartridge 36 further includes a pinch/guide wheel 46 rotatably mounted thereto and positioned to contact and cooperate with drive/guide wheel 28 mounted on housing 12. The interaction of the pinch-guide wheels is preferably accomplished by spring loading at least one of the wheels.

Figure 4A:
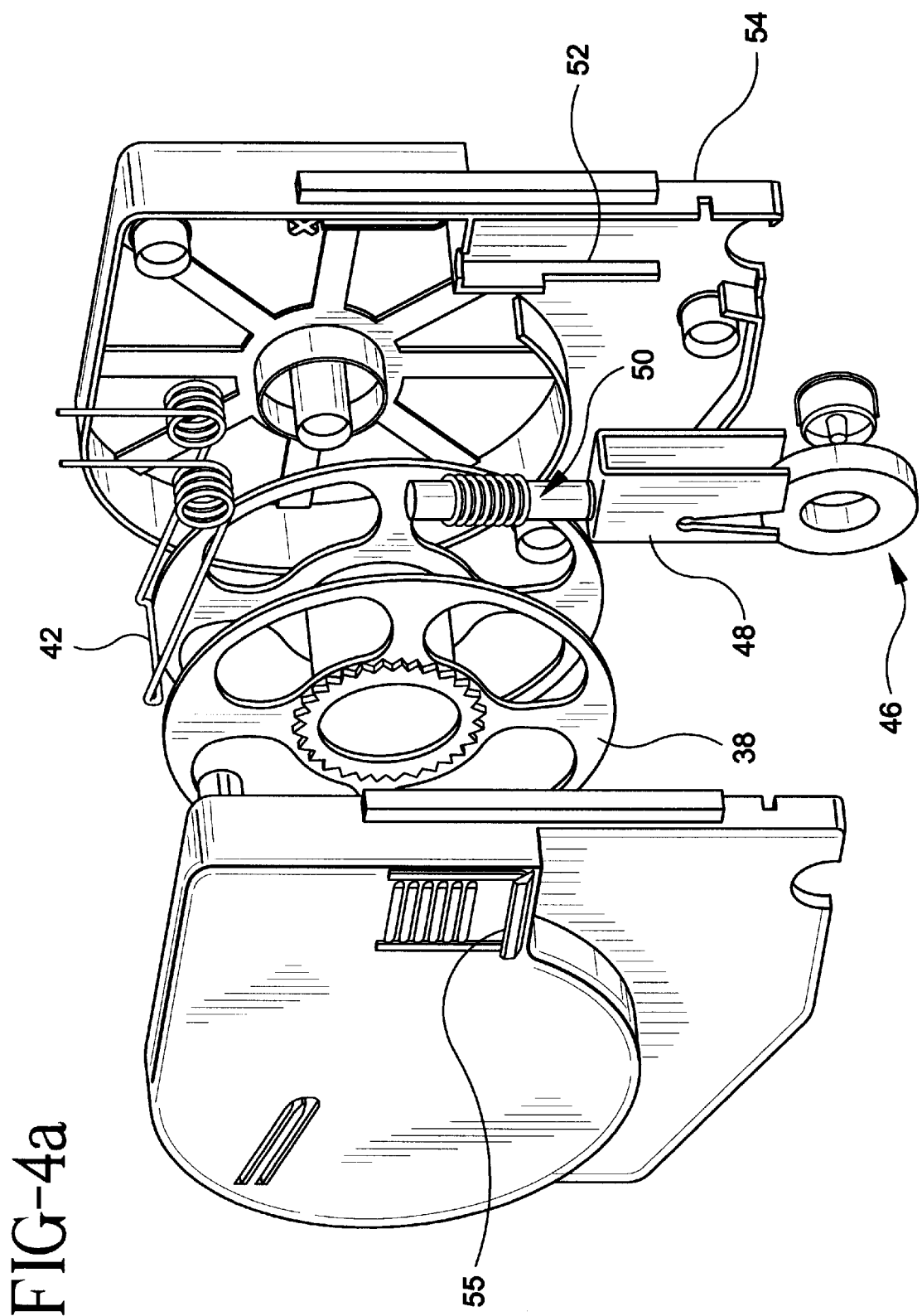
FIG. 4a is an exploded perspective view of the tape-supplying cartridge.

For example, pinch/guide wheel 46 may be spring loaded within cartridge 36 such that securement of cartridge 36 to housing 12 of the tool forces wheel 46 into engagement with wheel 28. As shown in FIG. 4a, a wheel guide 48 and a spring assembly 50 may be utilized to accomplish the spring loading of pinch/guide wheel 46. As shown, wheel guide 48 is sized to cooperate with a track 52 formed in housing 54 of cartridge 36. Housing 54 preferably includes a guide strip 53 for positioning the cartridge with respect to the tool and a snap-lock connector 55 for securing the cartridge to the tool. Assembly of the mentioned components is shown in FIG. 4b.

Cartridge 36 preferably includes a slack take-up region 56 for receipt of excess tape during the tensioning process. During this stage of the bundling operation, the direction of rotation of drive/guide wheel 28 is reversed (from clockwise rotation to counter-clockwise rotation) to tension the tape looped about the bundle of articles in the jaw assembly of the tool. The excess tape is thus pulled into housing 54 and received within slack take-up region 56.

Cartridge 36 further includes an exit chute 58 for exit of tape 40 from the cartridge and into the tool. This exit chute may be configured with a trap door which closes following complete dispensing of the tape from the cartridge. Of course, it is contemplated herein that other cartridges assemblies suitable for supplying a supply of weldable tape to the gun may be utilized with the tool of the present invention. It is further contemplated that the supply of weldable tape could be located on a spool separate from the tool itself.

Figure 4B:
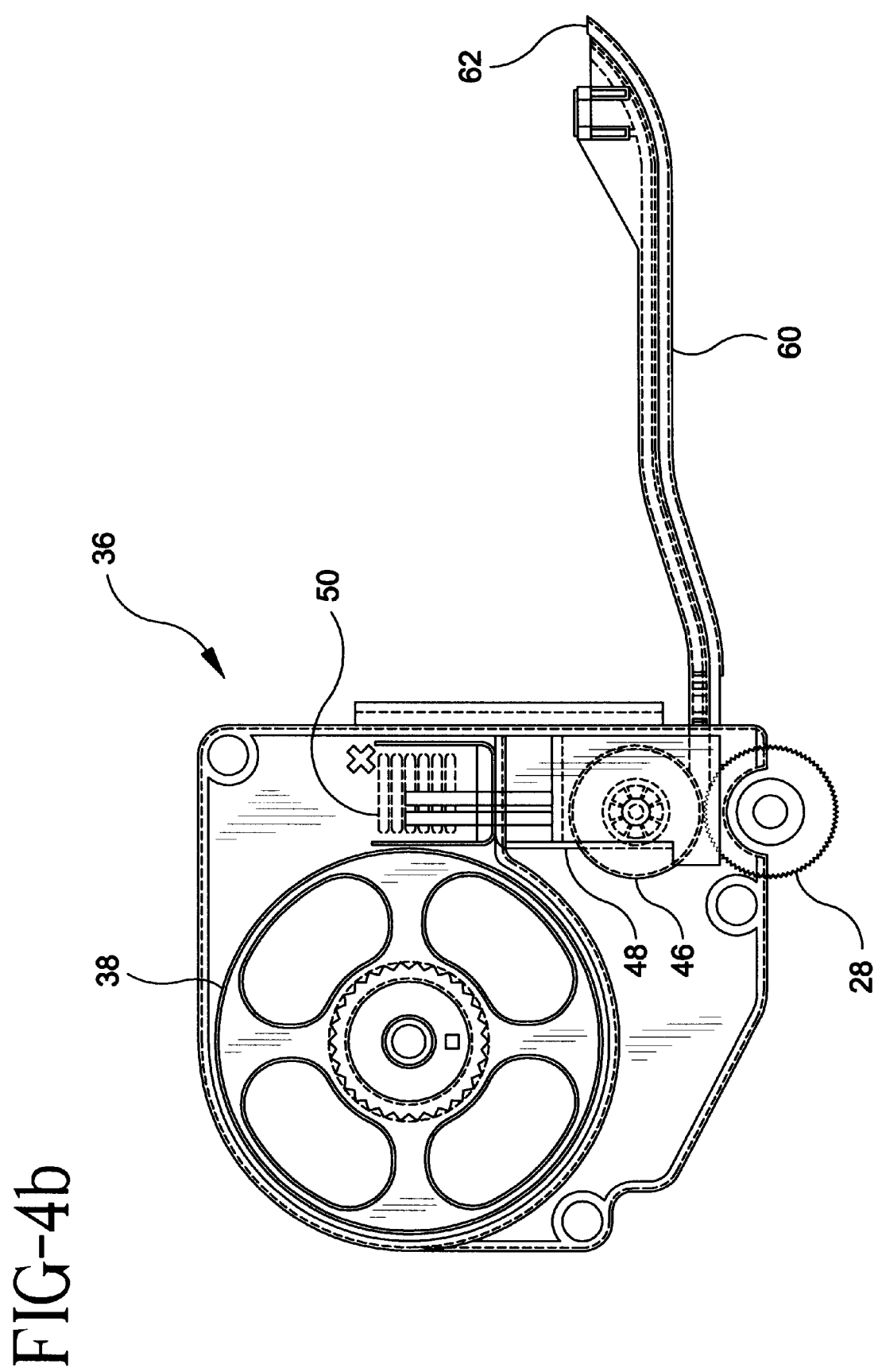
FIG. 4b is an elevational view of the tape-supplying mechanism of the present tool.

Referring now to FIG. 4b, tool 10 preferably includes a tape track 60 for guiding the tape exiting from the cartridge through the tool. In this regard, track 60 includes a track exit 62 which cooperates with a second tape track 63 to be discussed further hereinbelow. Tape track 60 is preferably one continuous track which provides one continuous passage from chute 58 to track exit 62. The tape passage, which is located within the tape track, is preferably dimensioned as to provide a passageway with little clearance between the tape and track. This ensures that the tape does not buckle as it is fed forward through the track.

Figure 5A:
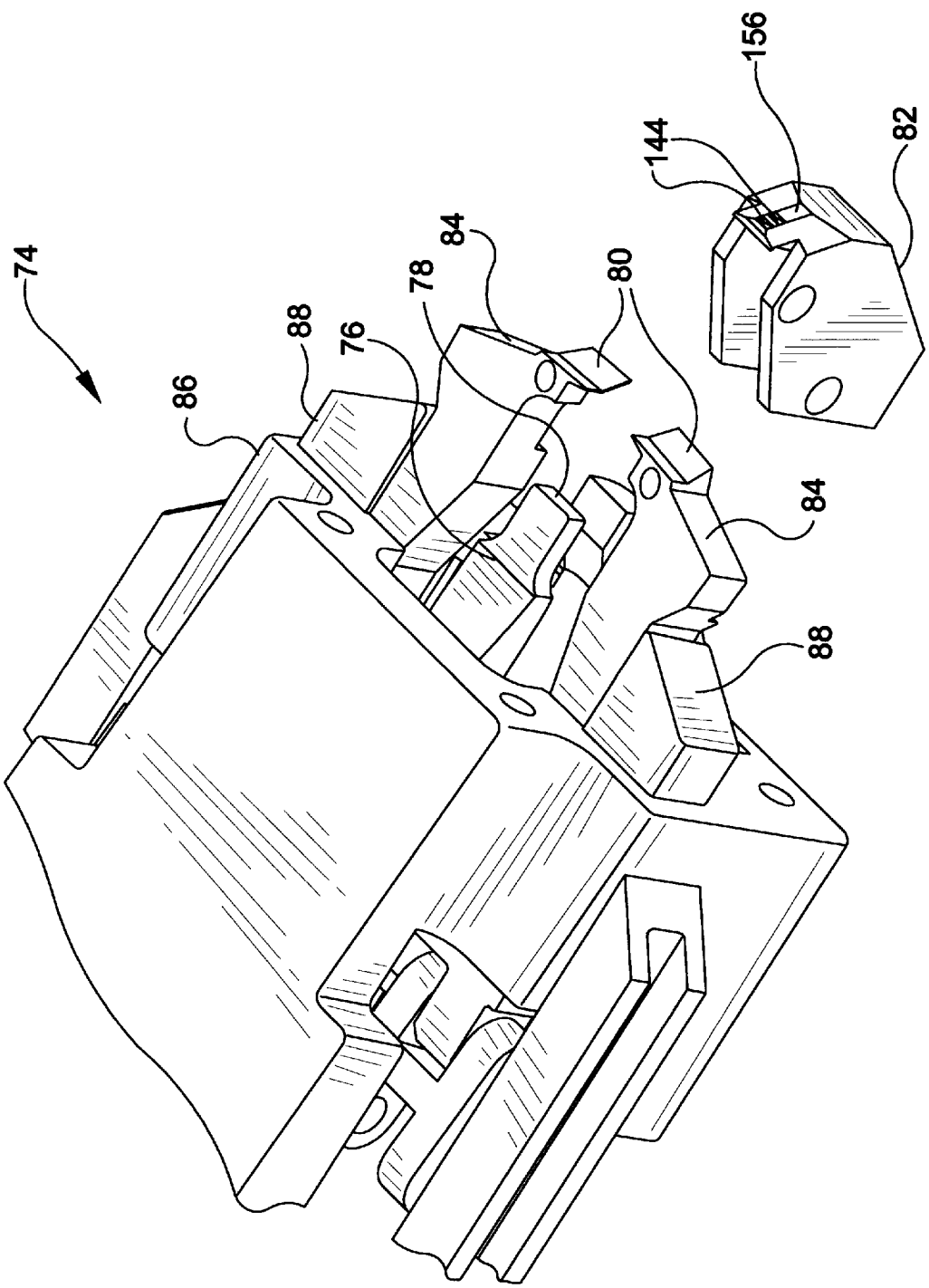
FIG. 5a is an enlarged detail of the horn assembly of FIG. 5.

Referring now to FIG. 5, a tool subassembly 64 is shown removed from housing 12. The subassembly 64 includes mounting platform 30 which supports a first motor 66 and a second motor 68. The first motor 66 cooperates with a gear assembly 70 for driving a crank shaft 72. The second motor 68 cooperates with a tape drive mechanism (not shown). The tape drive mechanism includes drive/guide wheel 28 and is designed to withdraw tape from cartridge 36 during the binding operation, and to tension the tape by withdrawing tape into slack take-up region 56 during the tensioning operation.

Subassembly 64 further includes horn assembly 74. In turn, horn assembly 74 includes ultrasonic horn 76 having an ultrasonic welding tip 78. Horn assembly 74 further includes a pair of movable anvils 80. Ultrasonic horn assembly 74 additionally includes a clamping block 82. The foregoing mentioned elements are shown in greater detail in FIG. 5a. Clamping block 84 has been exploded away from horn assembly 74 for purposes of clarity.

Anvils 80 are formed on the distal portion of a pair of opposing arms 84. Housing 86 of horn assembly 74 is configured to allow reciprocal motion of arms 84 therein. In this regard, housing 86 includes a pair of opposing guide blocks 88 which urge anvils 80 towards one another as the arms are withdrawn into housing 86. As will be discussed in further detail hereinbelow, arms 84 are formed with flexible hinge portions which tends to urge arms 84 outward once the distal portion of the arms have been extended beyond guide blocks 88.

Figure 6:
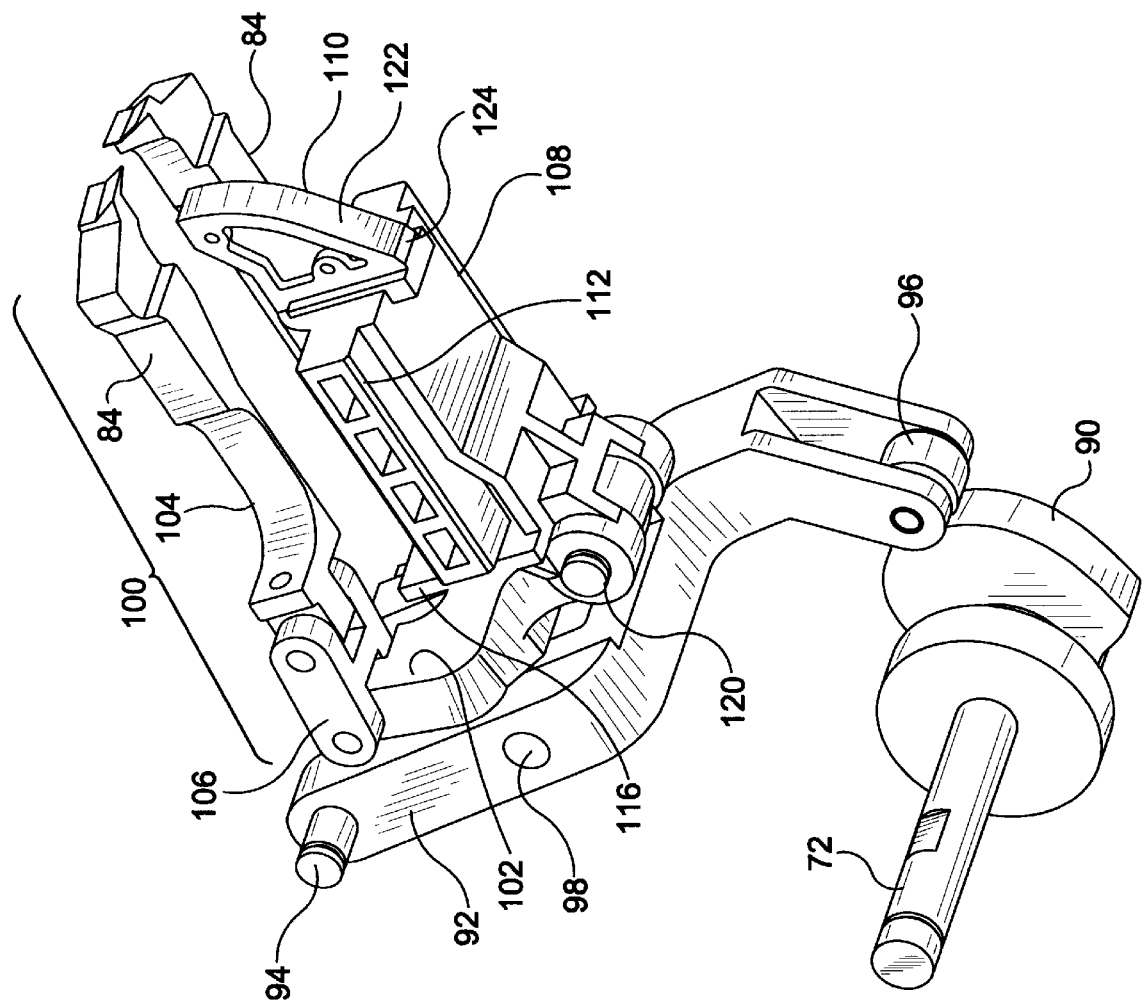
FIG. 6 is a perspective view of the subassembly including the anvils and clamping block.

Referring now to FIG. 6, crank shaft 72 includes a cam 90 having a plurality of eccentric surfaces thereon. Horn assembly 74 includes a lever 92 which pivotally mounts to housing 86 about pin 94. Lever 92 includes a guide wheel 96 which follows the eccentric surfaces located on cam 90. A spring (not shown) is utilized to urge lever 92 clockwise about pin 94 such that guide wheel 96 follows and remains in contact with cam 90. Lever 92 further includes a roller 98 which contacts and imparts translational movement to anvil subassembly 100.

In turn, anvil subassembly 100 includes arm 102 which contacts and thus cooperates with roller 98. However, anvil subassembly 100 is not directly connected to lever 92. Rather, contact between lever 92 and anvil subassembly 100 is limited to the physical contact of roller 98 and a rearward surface of arm 102.

As shown, anvil arms 84 include a flexible hinge portions 104 which allow flexing of the distal end of the arm during translational movement within housing 86. Anvil arms 84 are connected to arm 102 via a coupling 106.

Anvil subassembly 100 further includes a block assembly 108 having a mounting bracket 110 located on a distal end thereof. Block assembly 108 includes an extending tongue 112 which cooperates and slides within a groove 114 formed in housing 86 (see FIG. 7). Block assembly 108 includes a stop flange 116 configured to cooperate and contact rearward surface 118 of groove 114, thereby preventing any further forward translational movement of block assembly 108 within housing 86. Block assembly 108 is connected to arm 102 via pin assembly 120.

Clamping block 82 is configured to surround mounting bracket 110 and be fixed thereto. When clamping block 82 is mounted to mounting bracket 110, the forward most portion of the tape track (i.e., second tape track 63 shown in FIGS. 13–14) is formed therebetween. Particularly, surface 122 of mounting bracket 110 forms one wall of the tape track 63, while an interior surface of the clamping block 82 forms the opposing wall of tape track 63. Track exit 62 of tape track 60 cooperates with an entry region 124 of mounting bracket 110. Although the translational movement of block assembly 108 with respect to housing 86 is relatively small, the interface between track exit 62 of tape track 60 and entry region 124 defined by the bracket/clamping block arrangement must provide sufficient tolerance to allow this movement. In one preferred embodiment, entry region 124 is formed with a funnel shape to facilitate the feeding of the tape into second tape track 63. Accordingly, as guide wheel 96 follows cam 90, translational movement of anvil arms 84 and block assembly 108 is accomplished.

As will be discussed further hereinbelow, the tool of the present invention overcomes certain disadvantages associated with prior art tools in that the present tool is capable of securing a tape about a bundle of elongate articles and thereafter welding and cutting the tape without loss of tension in the bundled articles and without leaving a loose cut end of tape adjacent the weld, such loose end forming a sharp edge or burr. In one preferred embodiment, the ultrasonic horn of the tool includes a tilting mechanism which allows the ultrasonic horn to be positioned in a first location for welding the overlapped tensioned tape to itself to secure the looped tape about the elongate articles and a second location which allows the horn to be displaced a distance from the weld for simultaneous ultrasonic cut-off and tackdown of the loose end of the tape. Thus, ultrasonic energy is applied at two successive instances: first to weld the overlapped tape to secure the tensioned loop about the elongate articles, and second to cut the tensioned loop free from the stock of tape and tack weld the cut-off loose end to the underlying tape, thus eliminating any unsecured loose ends or protruding sharp edges. It is contemplated herein that other two step welding operations may be suitable for securing a weldable tape about a bundle of elongate articles. For example, the ultrasonic horn may undergo movement other than rotation to produce the displacement of the welding tip or more than one welding tip could be utilized.

Figure 7:
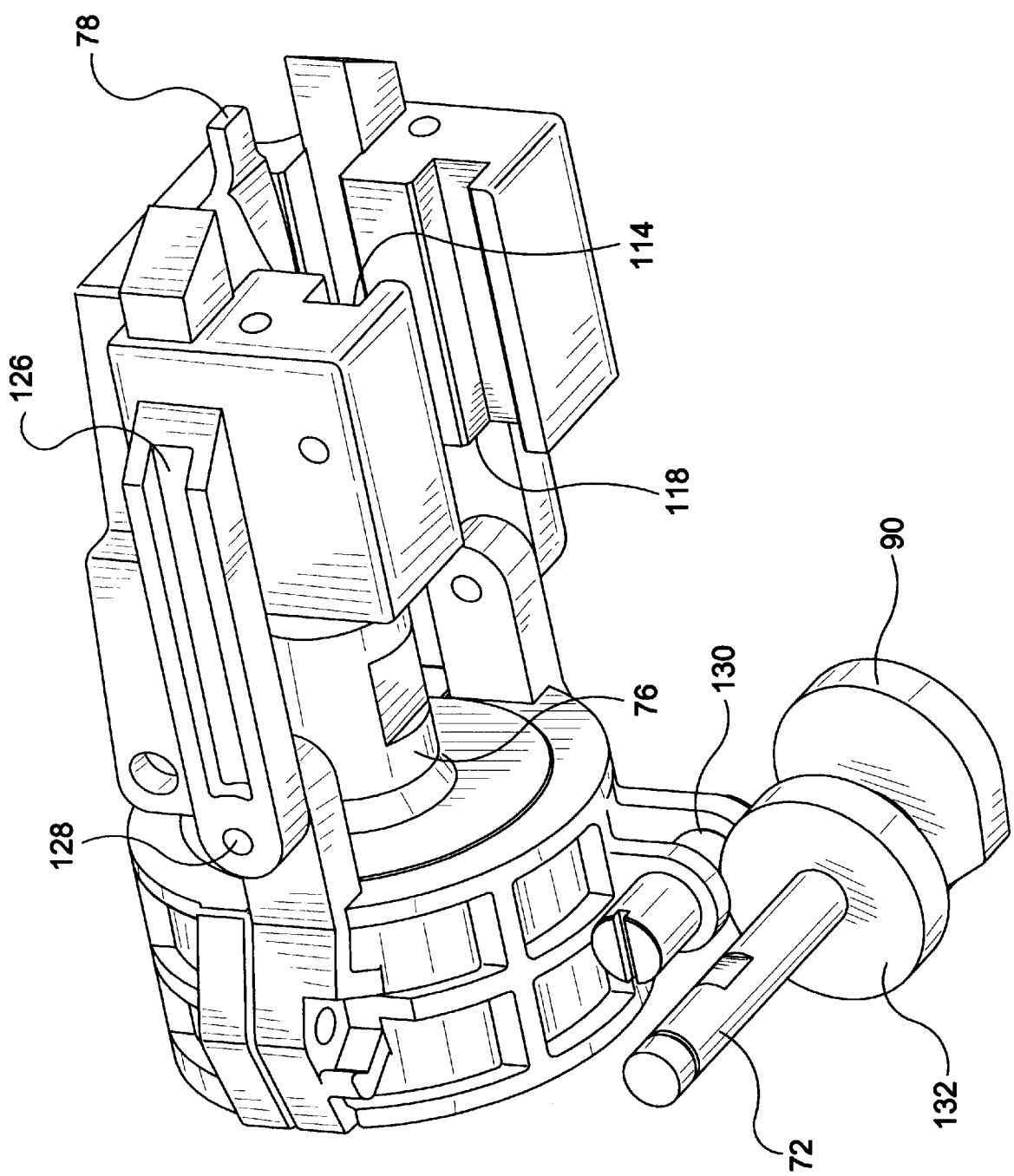
FIG. 7 is a perspective view showing the ultrasonic horn subassembly.

The tilting mechanism of the present tool is explained with reference to FIG. 7. Horn assembly 74 includes a pair of opposing grooves 126 which cooperate with a pair of opposing tongues (not shown) formed on the interior of housing 12, thereby locating and fixing horn assembly 74 within housing 12. When located within housing 12, housing 86 of horn assembly 74 is fixed with respect to housing 12. The ultrasonic welding horn 76 is pivotally mounted to housing 86 via pivot pin 128. Horn 76 includes a rotatably mounted guide wheel 130 located at the end opposite welding tip 78. Guide wheel 130 follows an eccentric cam 132. Cam 132 includes a single eccentric surface which pivots horn 76 about pin 128 between a welding position and a cutting/tack welding position.

Figure 8:
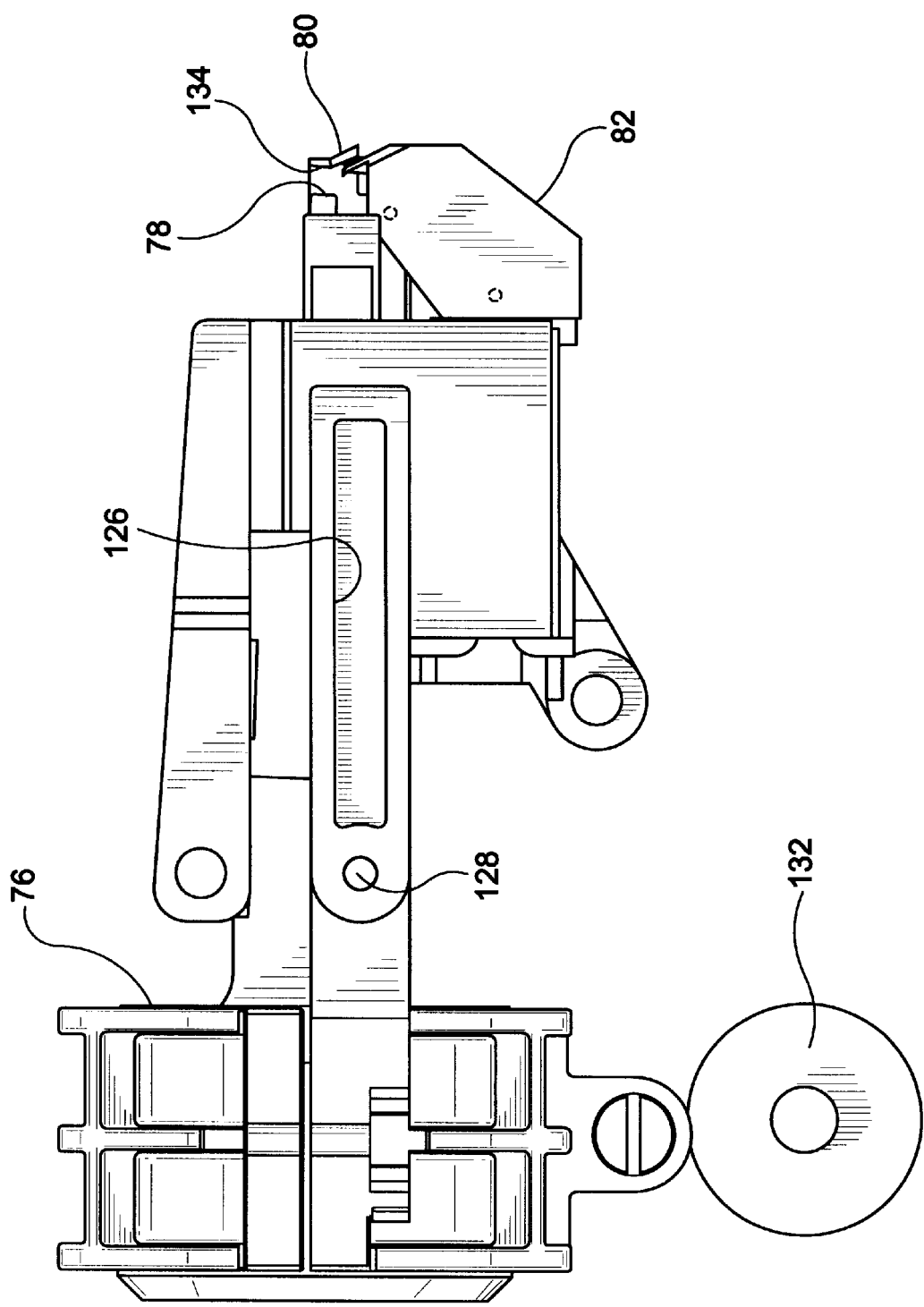
FIG. 8 is an elevational view of the ultrasonic horn with the welding tip in its untilted, welding position.
Figure 9:
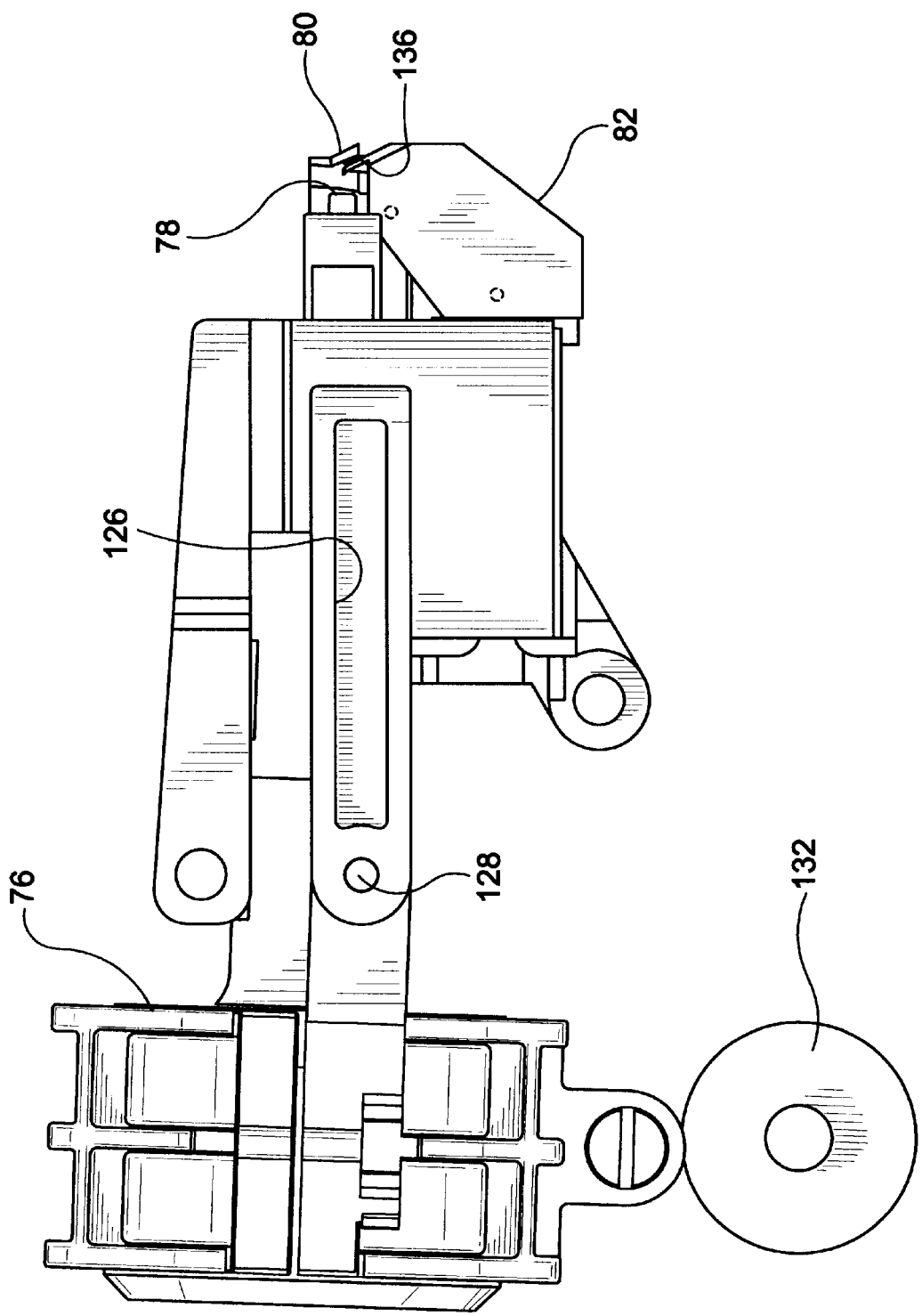
FIG. 9 is an elevational view of the ultrasonic horn with the welding tip in its tilted, cutting/tack welding position.

Referring now to FIG. 8, ultrasonic horn 76 is shown in its welding position. In this position, tip 78 is aligned with a first vertically extending rearward portion 134 of anvil 80. It is to be noted that a horizontal axis passing through pin 128 is spaced a distance below a horizontal axis passing through the center of ultrasonic horn 76. In this fashion, as tip 78 is rotated about pivot pin 128, the movement of tip 78 with respect to anvil 80 is substantially vertically downward. As shown in FIG. 9, ultrasonic horn 76 is pivoted about pivot pin 128 when guide wheel 130 contacts the eccentric portion of cam 132. This pivoting movement translates tip 78 substantially vertically downward such that tip 78 is located adjacent cutting edge 146, with tape 40 positioned therebetween.

Figure 10:
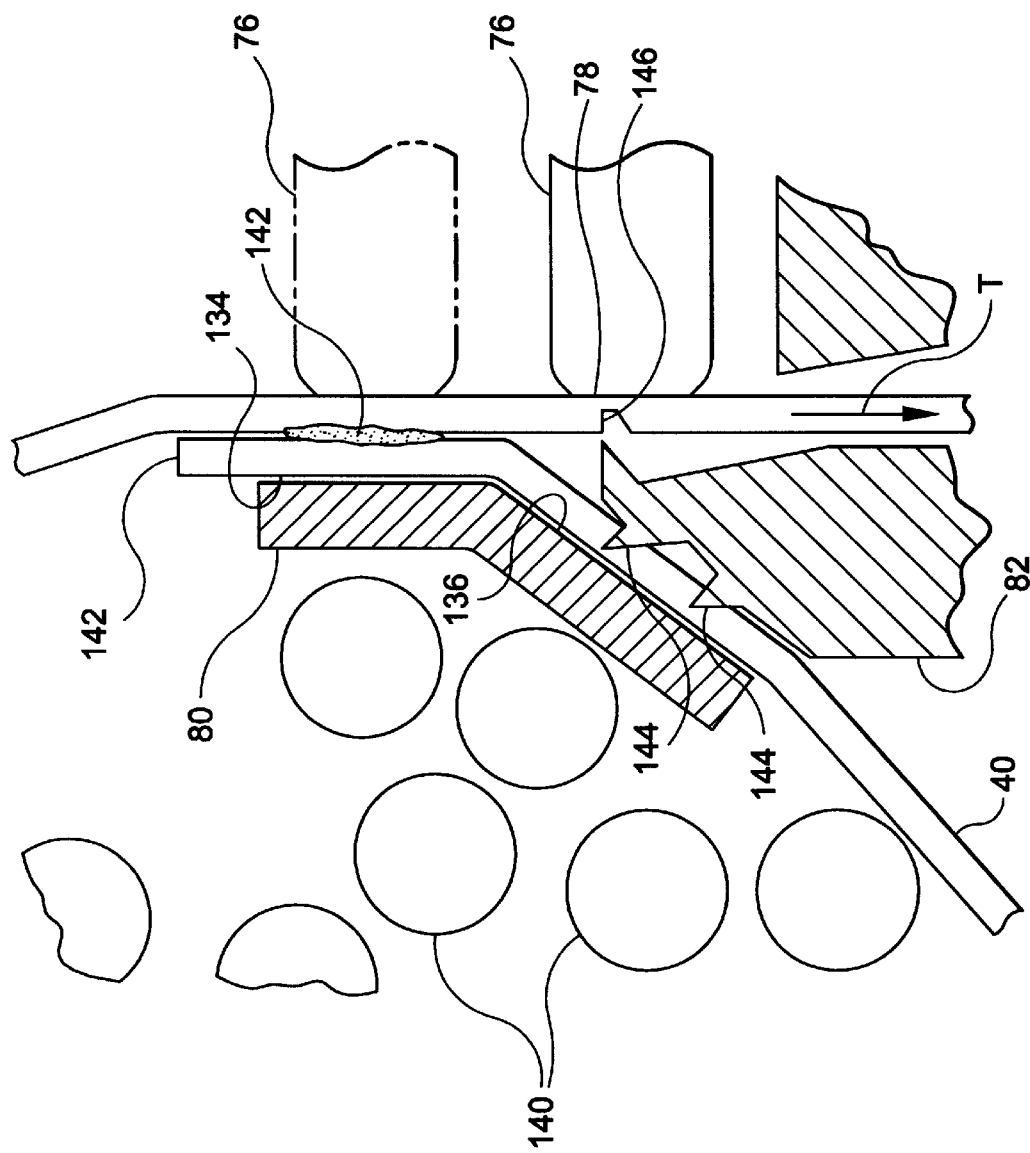
FIG. 10 is an enlarged detail of the welding/cutting operation.

Referring now to FIG. 10, tape 40, which is looped about a plurality of wires 40, has a leading free end 142 and a trailing end connected to the stock of the tape contained in the cartridge. Horn 76 is shown in phantom opposite primary weld 142. After the overlapped tapes are secured to one another via weld 142, horn 76 is rotated about pivot pin 128 such that welding tip 78 is displaced vertically downward such that the tip is adjacent to clamping block 82. Clamping block 82 includes a plurality of teeth 144 which bite into and hold tape 40 thereagainst. Clamping block 82 further includes a cutting edge 146. Operation of the ultrasonic horn in this vertically displaced location forces tape 40 against cutting edge 146, thereby cutting the welded tensioned loop from the stock of tape contained in the cartridge. During the welding and cutting operations, tension is maintained in the tape in the direction of arrow T. As shown in FIG. 11, the welded tensioned loop has been cut free from the stock of tape. As distal end 148 of tape 140 is cut free from the stock of tape, it is simultaneously tack welded at its outer edges via ultrasonic horn 76.

To ensure that the looped tape remains in a tensioned state during the welding operation, welding horn 76 is configured as to form two primary welds 142 (see FIG. 12) without welding entirely across the width of the tape. It will be recognized by those skilled in the art, that welding entirely across the width of the tape allows the tape to lose its tension during such operation. The second tack welding operation also produces two tack welds, i.e., welds 150, which secure distal end 148 of the tape to the underlying tape of the tensioned loop, thereby eliminating the undesirable loose end which otherwise results from the cutting operation.

Figure 13:
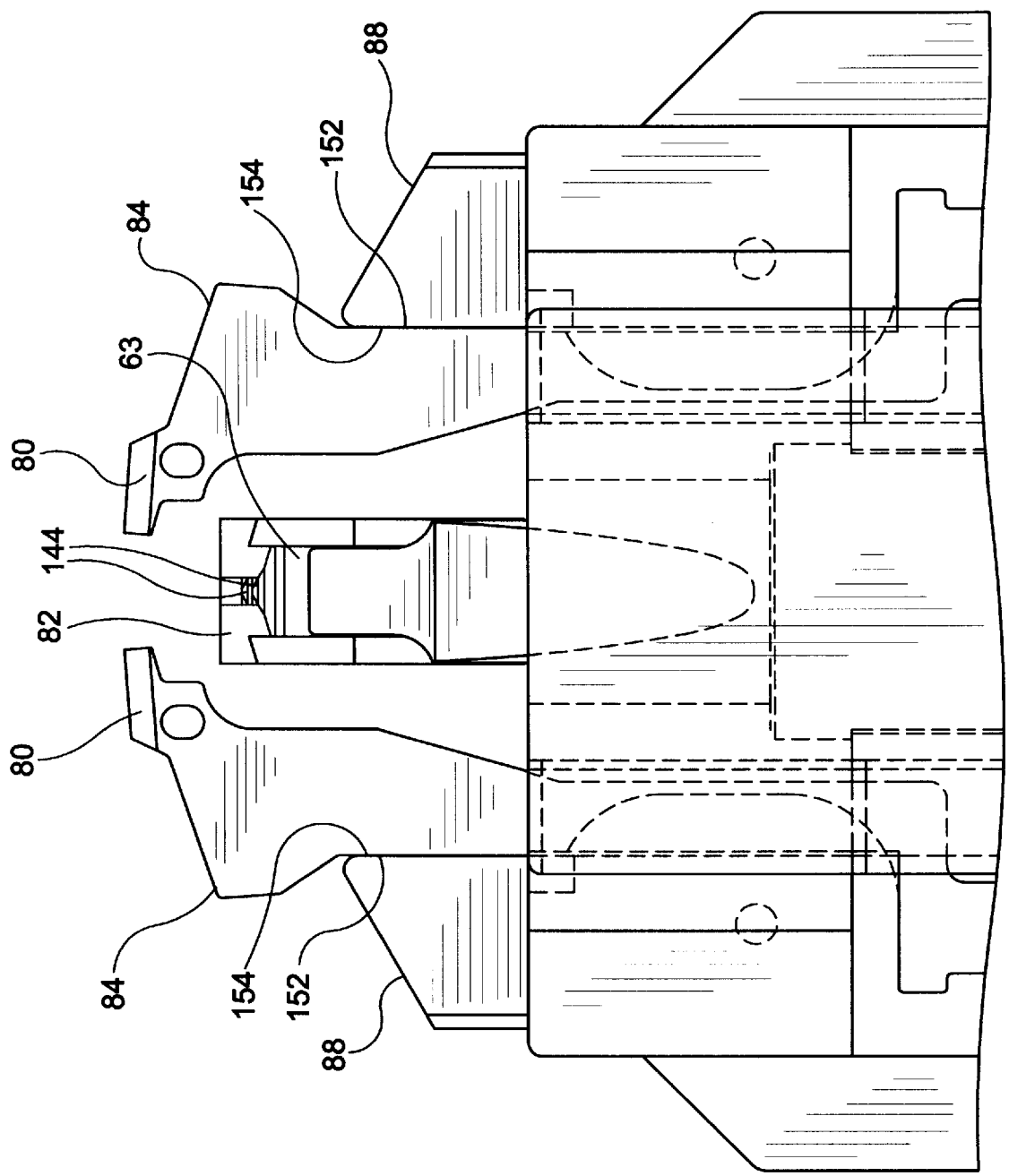
FIG. 13 is a plan view showing the anvils in a home position.

The operation of the tool will now be described in more detail with reference to FIGS. 13–16. The tool is preferably programmed to run through a series of steps during one complete cycle. During the first step of the cycle, anvils 84 are positioned in a "home" position, as shown in FIG. 13. In this home position, anvils 84 are extended outward from housing 86 the maximum distance whereby surfaces 152 of guide blocks 88 contact surfaces 154 of arms 84. In this positions, anvils 80 are spaced at a maximum distance from one another. The tape is feed through the tool until leading end 142 of the tape rests approximately 1/16 inch above the anvils (see FIGS. 10–11).

Figure 14:
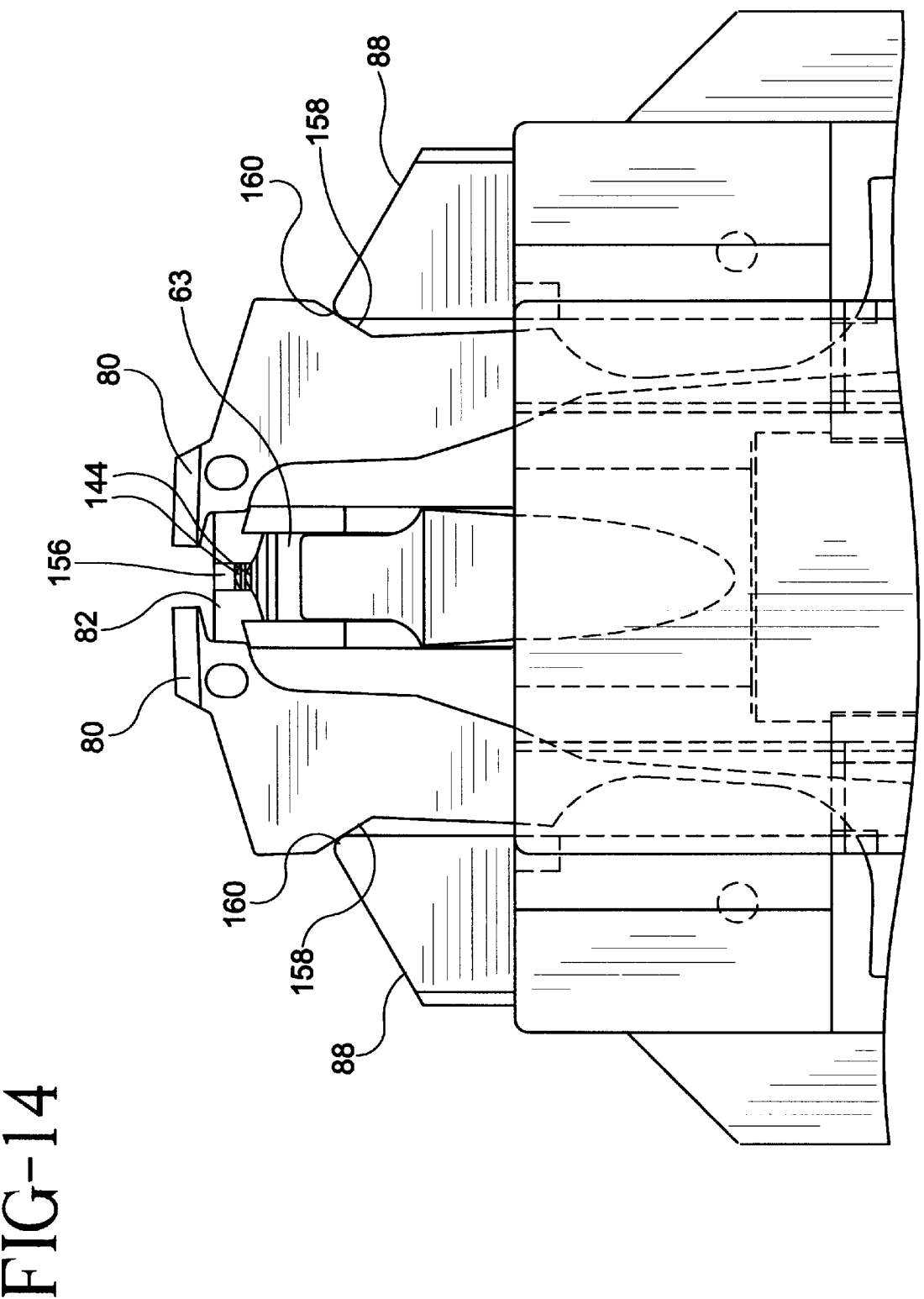
FIG. 14 is a plan view showing the anvils in a guide position.

Thereafter, anvils 80 are withdrawn towards clamping block 82 to place the tool in the "guide" position, as shown in FIG. 14. In this position, the jaw assembly has closed to encircle the bundle of articles. Once the anvils are in the guide position, tape is fed upward through tape track 63 around the interior of the jaw assembly until the tape extends between lower angled surfaces 136 of anvils 80 and surface 156 of clamping block 82 (see FIG. 5a). Surface 156 includes teeth 144 which grip the tape when such tape is pressed thereagainst by anvils 80.

Figure 15:
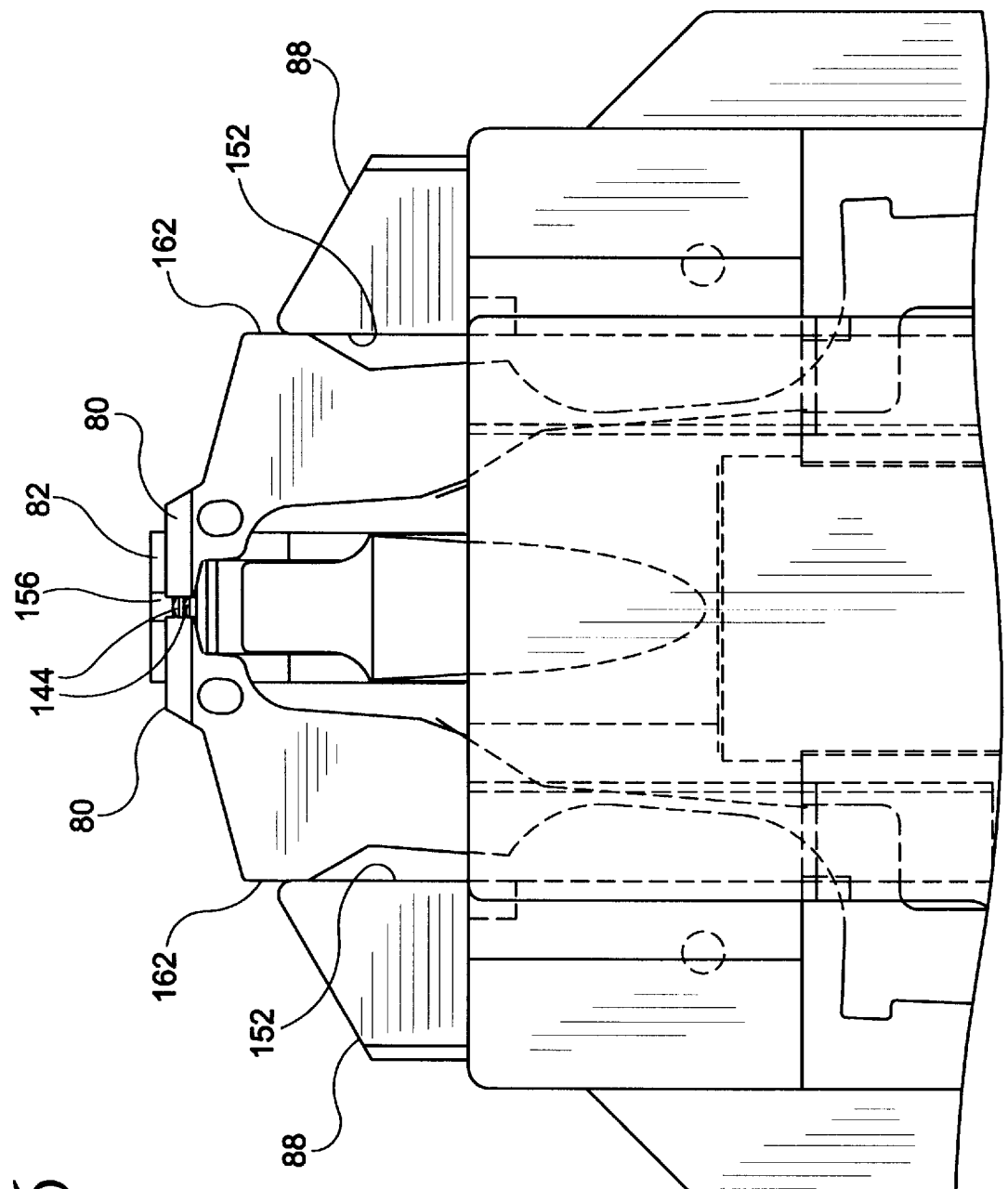
FIG. 15 is a plan view showing the anvils in a clamp position.

Thereafter, the anvils are further withdrawn to clamp tape 40 between lower surfaces 136 of anvils 80 and surface 156 of clamping block 82 and place the tool in the "clamp" position, as shown in FIG. 15.

It can be seen in the guide position that surfaces 158 of arms 84 contact rounded corners 160 of guide blocks 88, thus urging anvils 80 toward one another. In the clamp position, surfaces 162 of arms 80 come into contact with surfaces 152 of guide blocks 88, thus urging anvils 80 even closer together.

Figure 16:
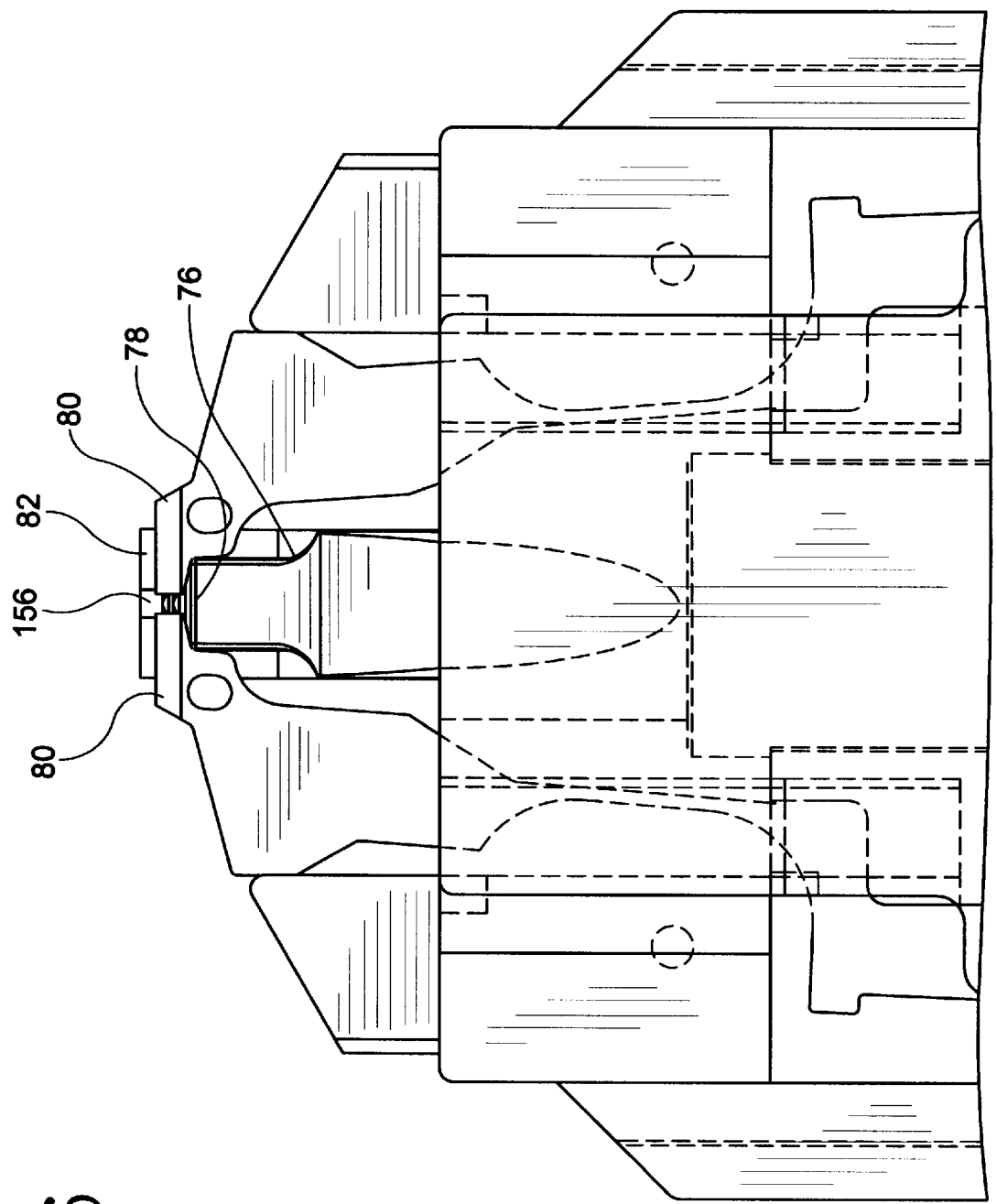
FIG. 16 is a plan view showing the anvils in a weld position.

Once the tape has been clamped between lower angled faces 136 of anvils 80 and clamping block 82, the second motor 68 (which operate the drive mechanism assembly) is reversed to apply tension to the loop of tape surrounding a bundle of wires 140. Thereafter, the cooperating anvils and guide block are translated toward tip 78 of ultrasonic horn 76 to place the tool in the "weld" position, as shown in FIG. 16. In this weld position, the anvils urge both layers of tape against welding tip 78 of ultrasonic horn 76 (see also FIG. 10). The ultrasonic horn is then actuated for a period of time sufficient to weld the overlapped tape together. Because the anvils are angled approximately 12° (see FIG. 5a) while the welding tip is flat, pressure is exerted on both sides of the tape. As a result, welding is effected at the locations indicated in FIG. 12, with no welding occurring at the center of the tape. Inasmuch as the center of the tape does not melt during the welding process, tension can be maintained on the looped tape during the welding process.

After the primary weld is accomplished, the anvils are translated a short distance away from welding tip 78 to allow welding tip 78 to rotate about pin 128 to its second cutting/tack welding position. Specifically, the anvils translate away from welding tip 78 to allow welding tip 78 to displace downward approximately 0.100 inches. Once the ultrasonic horn is in the cutting/tack welding position, anvils 80 and clamping block 82 are retracted to urge cutting edge 146 into contact with tape 40. The combination of pressure applied by cutting edge 146 and ultrasonic energy (which soften the tape) results in the tensioned loop being severed from the stock of tape. As the tensioned loop is severed from the stock of tape, ultrasonic horn 76 tack welds the distal end 148 to the underlying layer of tape thus eliminating any unsecured loose ends or protruding sharp edges. Following the cutting operation, the tool returns to the home position for the start of a second cycle.

Figure 17:
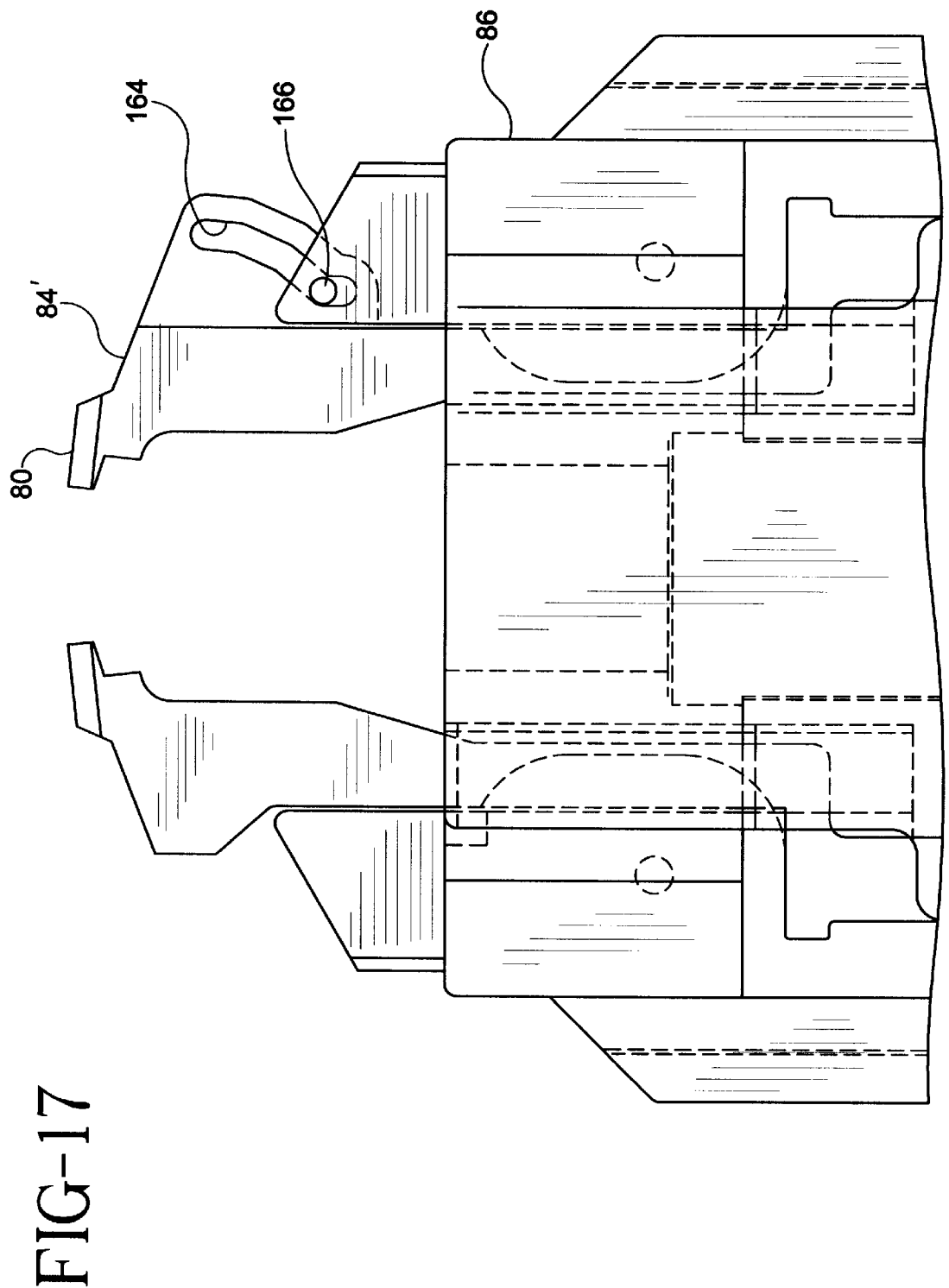
FIG. 17 is a plan view showing an alternative embodiment of the anvil arm.

An alternative anvil arm 84' is shown in FIG. 17. In this alternative embodiment, anvil arm 84' includes a guide slot 164 which cooperates with a guide pin 166, thus causing anvils 80 to move with respect to one another as anvils 80 are moved with respect to housing 86.

Figure 18:
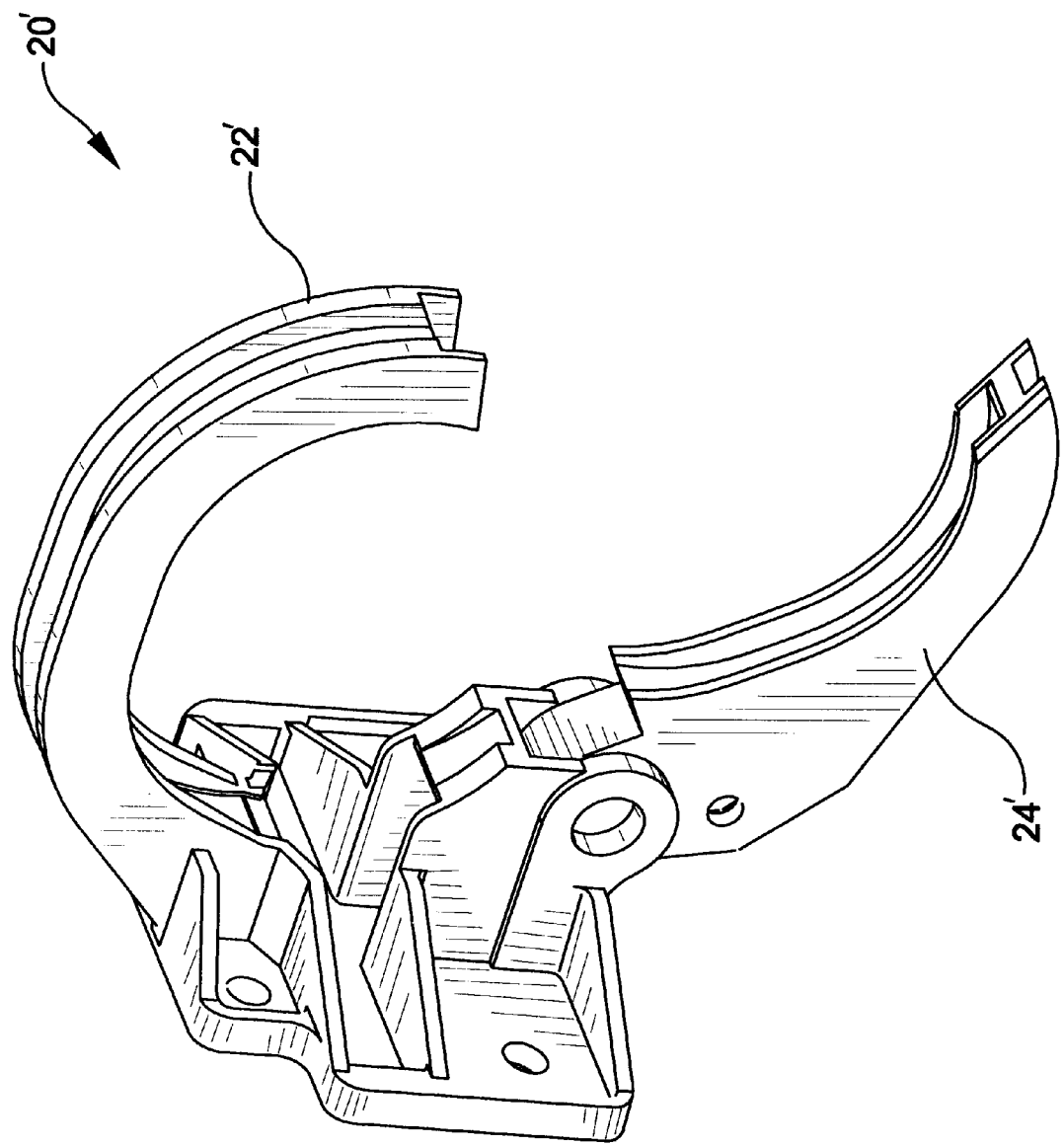
FIG. 18 is an alternative embodiment of the jaw assembly.

An alternative jaw assembly is shown in FIG. 18. Particularly, alternative jaw assembly 20' includes an upper stationary jaw 22' configured to loop about a bundle of elongate articles. Jaw assembly 20' further includes a shorter lower moveable jaw 24'. The configuration of jaw assembly 20' may facilitate the bundling of elongate articles in certain applications.

Figure 19:
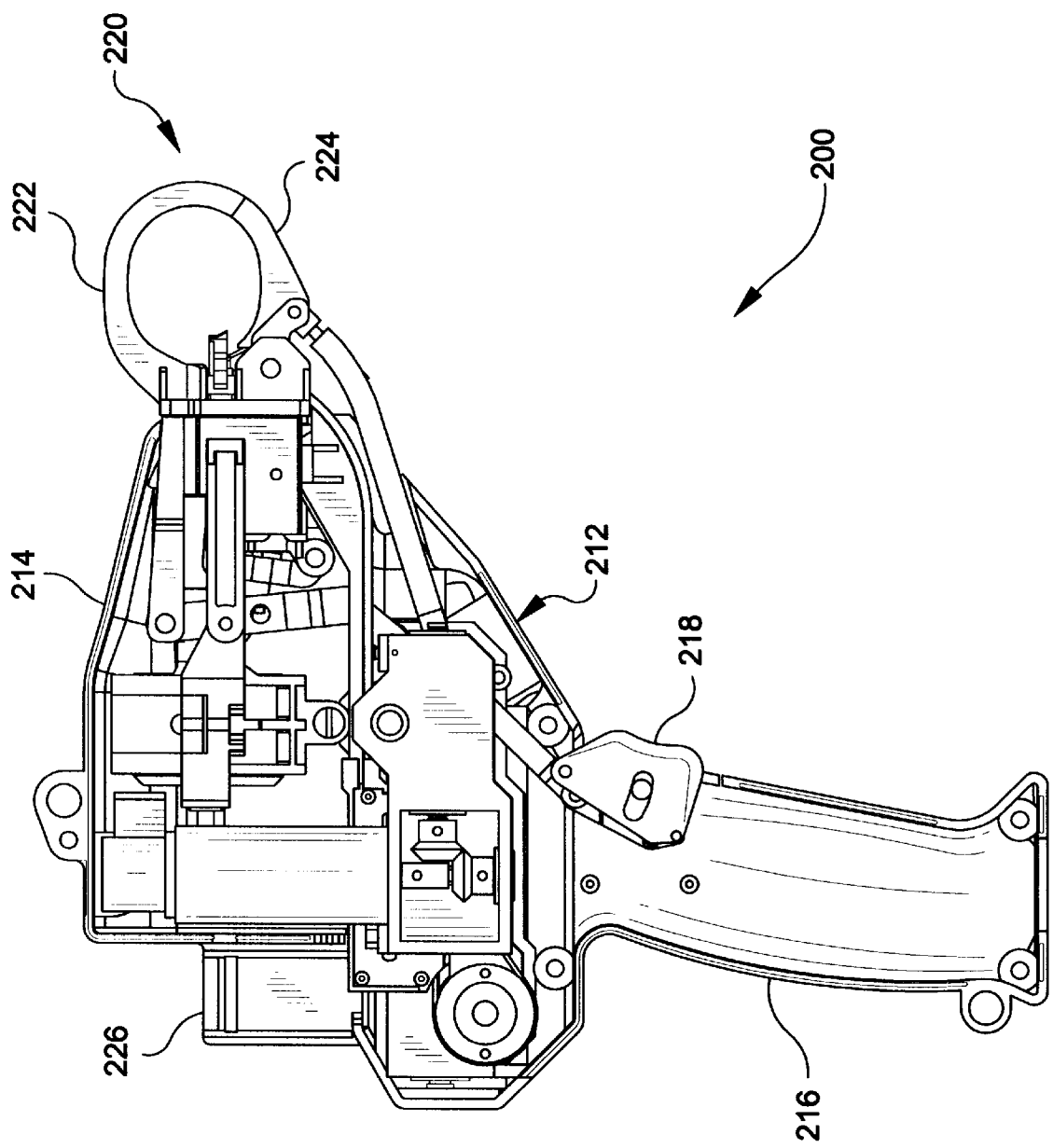
FIG. 19 is an elevational view of an alternative tool with a portion of the housing removed.
Figure 20:
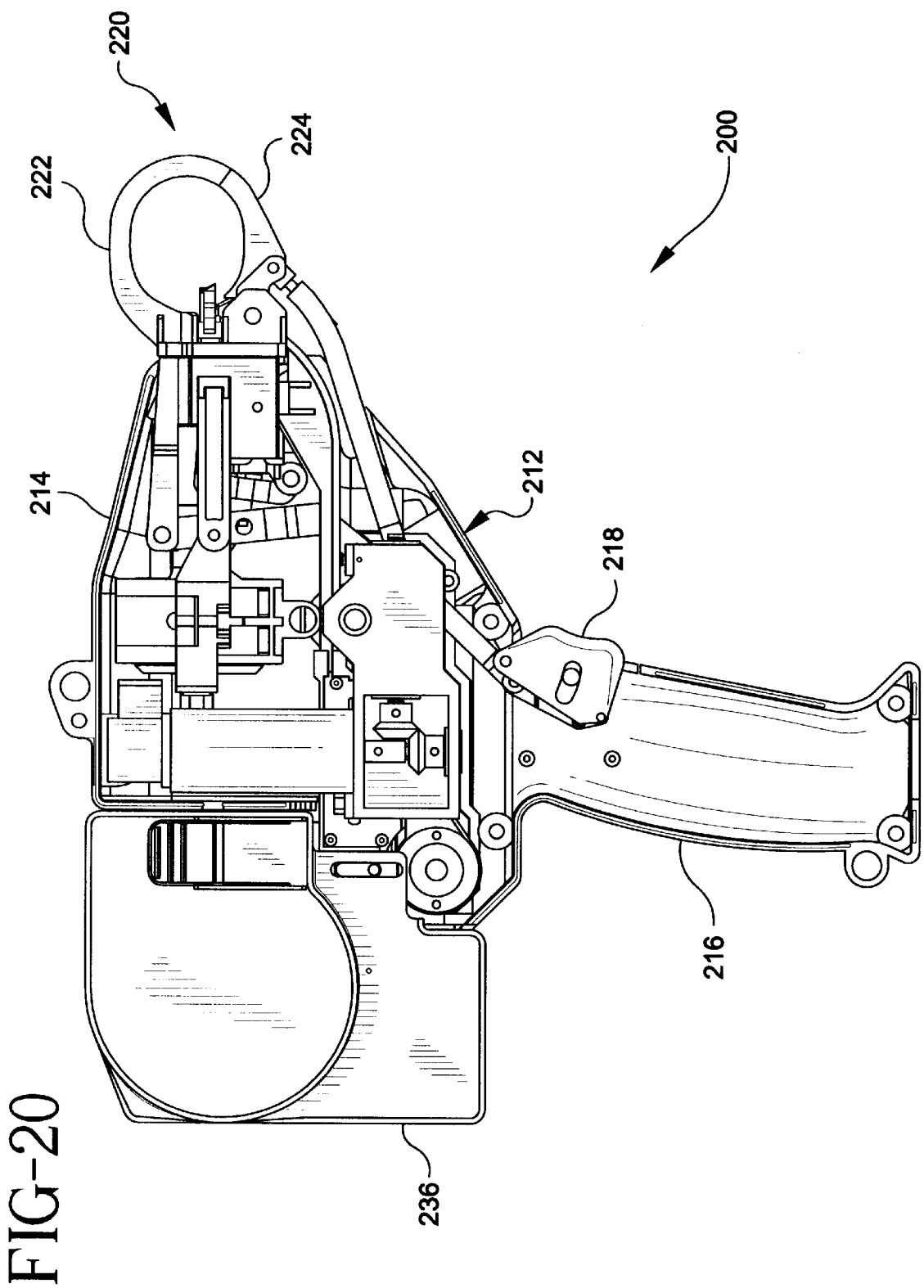
FIG. 20 is a view similar to FIG. 19 showing a tape-supplying cartridge secured to a rearward portion of the tool.

An alternative tool, i.e., tool 200, is shown in FIGS. 19–20. Except as discussed hereinabove, tool 200 is similar to tool 10 in design and operation. In this regard, tool 200 includes a generally pistol-shaped housing 212, the housing including a body 214 and a handle 216. A trigger 218, for operating the tool, is provided on handle 216. A jaw assembly 220 is provided on a forward end of tool 200. Jaw assembly 200 includes an upper stationary jaw 222 and a lower movable jaw 224. It will be noted that the positioning of the jaws has been reversed from the positioning of the jaws of tool 10 shown in FIGS. 1–3. More particularly, the shorter jaw component (i.e., jaw 224 in tool 200) is utilized as the movable jaw component and is located to form the lower portion of the jaw assembly in tool 200 (similar to the design described with respect to FIG. 18). In this manner, elongate articles are more readily grasped in that the upper curved jaw may be placed thereabout without the need to excessively maneuver the tool.

Figure 21:
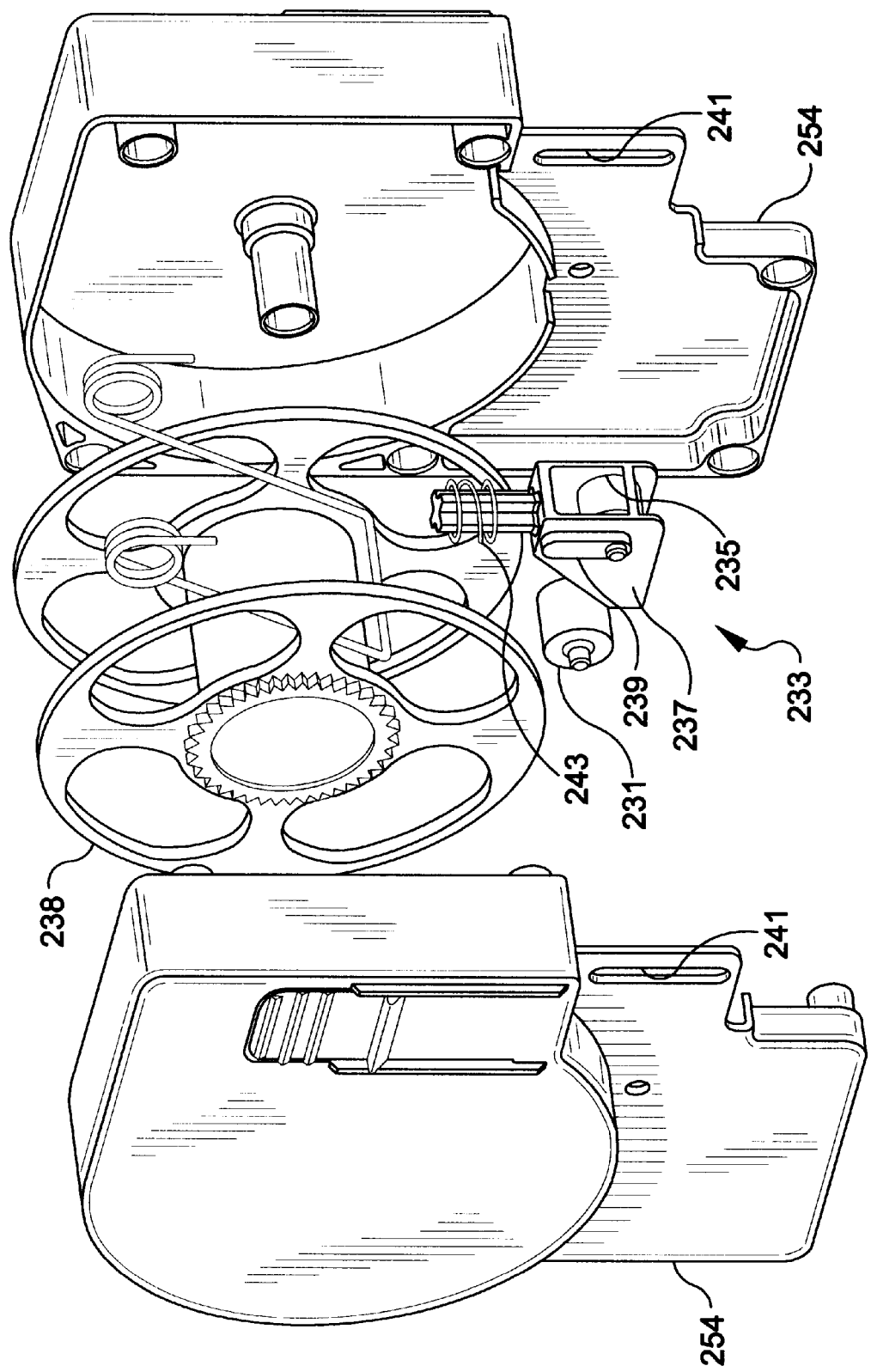
FIG. 21 is an exploded perspective view of the tape-supplying cartridge of FIG. 20.
Figure 22:
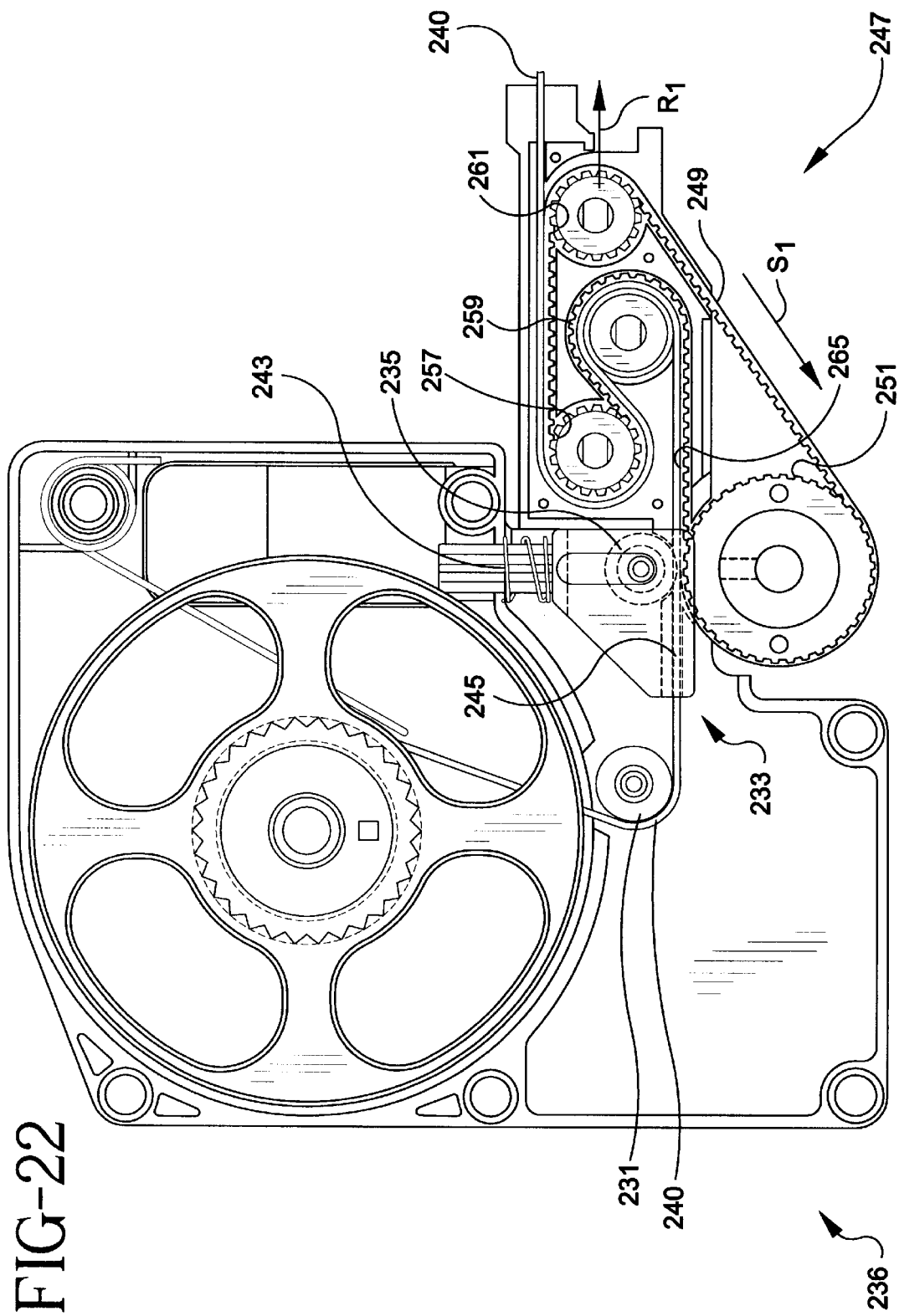
FIG. 22 is an enlarged detail of the tape-supplying cartridge and belt drive mechanism of the tool of FIG. 19.

The rear portion of body 214 includes a cartridge mounting interface 226 configured to receive and cooperate with tape supplying cartridge 236. Except as discussed below, cartridge 236 is similar to cartridge 36. Referring now to FIGS. 21–22, it will be noted that pinch/guide wheel 46, wheel guide 48, spring assembly 50 and track 52 of cartridge 36 have now been replaced with a guide wheel 231 and a spring loaded tape guide assembly 233. Assembly 233 includes a pinch wheel 235 rotatably supported within wheel housing 237. Shoulder 239, which is stepped outward a distance from a sidewall of the wheel housing, is captured within elongated raceway 241 formed in cartridge housing 254 upon assembly of the cartridge. A spring 243 biases wheel housing 237 and pinch wheel 235 towards tape 240 when cartridge 236 is assembled and mounted on the tool (see FIG. 22). Finally, wheel housing 237 includes a guide channel 245 sized to facilitate passage of tape 240 therethrough. In this regard, channel 245 is formed with a height dimension sufficient to allow passage of the tape without buckling, but not so great as to allow out-of-plane buckling of the tape which can produce jamming of the tape as the tape is advanced through wheel housing 237.

Figure 23:
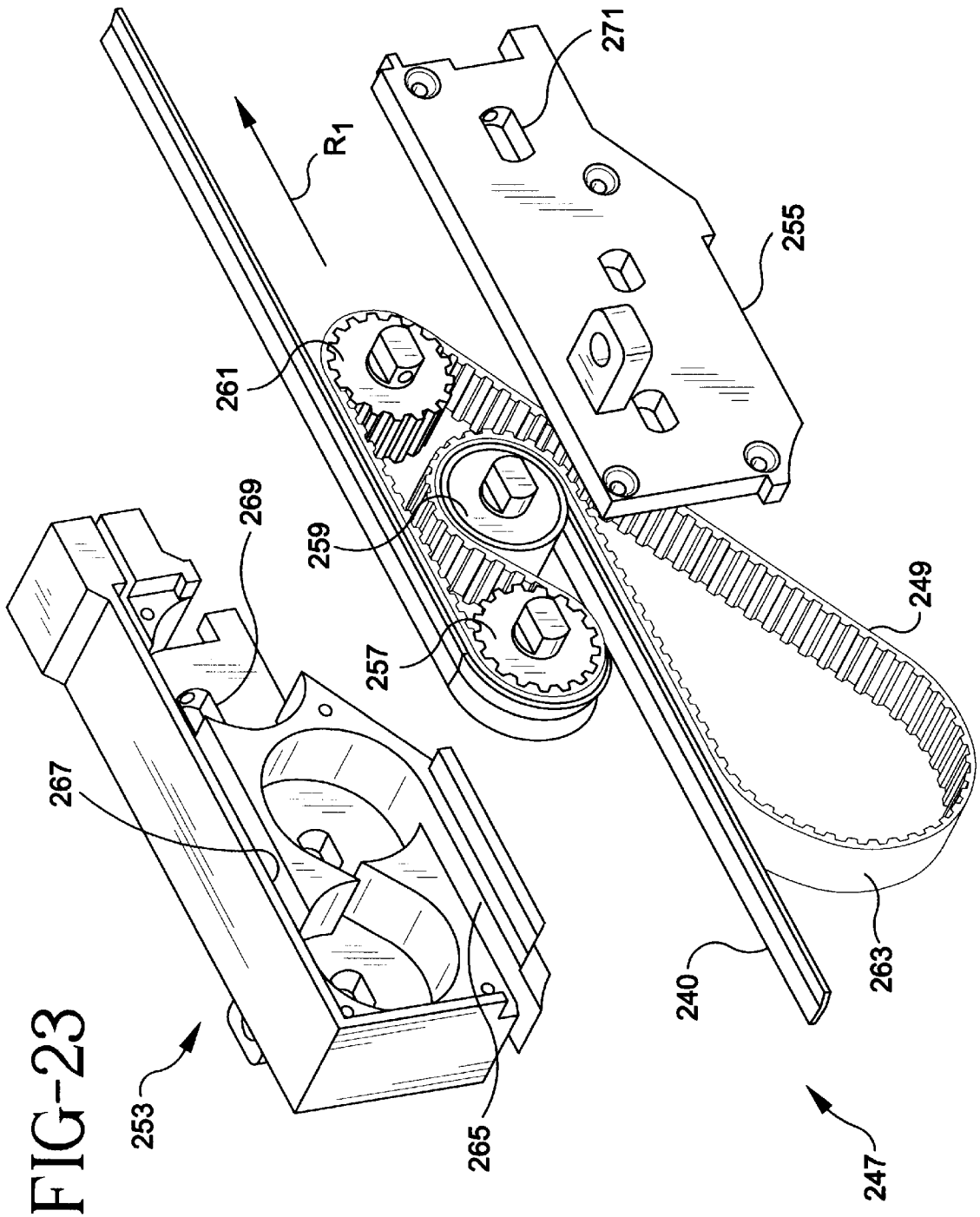
FIG. 23 is an exploded perspective view of the belt drive mechanism of the tool of FIG. 19.

Unlike tool 10 which utilizes drive/guide wheel 28 and pinch/guide wheel 46 to advance and or tension the weldable tape, tool 200 utilizes a belt drive mechanism 247 for advancement and tensioning of the tape (see FIGS. 22–23). Mechanism 247 includes drive belt 249, drive wheel 251, drive housing 253, cover 255, and wheels 257, 259 and 261. Drive wheel 251 is driven by one of the two motors incorporated into the tool. As shown, belt 249 is preferably a toothed belt having a substantially planar tapecontacting surface 263.

Tape 240 travels through guide channel 245, is pinched between pinch wheel 235 and belt 249 and thereafter is fed into a guide channel 265 formed in drive housing 253. Belt 249 defines one wall of guide channel 265. The tape is therefore captured between the belt and an inner wall surface of drive housing 253. It is to be noted that guide channel 265 prevents out-of-plane buckling of the tape as the tape is advanced. In one preferred embodiment, tape 240 has a thickness of 0.020 inches and a width of 0.180 inches, while guide channel 265 has a height of 0.050 inches (as measured between the tape-contacting surface of belt 249 and the opposing wall of drive housing 253) and a width of 0.200.

Following advancement of tape 240 through channel 265, tape 240 is fed between wheel 259 and belt 249. Tape 240 is then carried around wheel 257 on surface 263 of belt 249 before being fed into a second guide channel 267. Again, belt 249 forms one wall of guide channel 267. Upon exiting guide channel 267, tape 240 is fed into a tape track (not shown) and advanced to the jaw assembly of the tool.

During feeding of the tape to the jaw assembly, belt 249 travels in the direction $S_1$ shown in FIG. 22. To tension the looped tape about the bundle of articles, the direction of rotation of drive wheel 251 is reversed which in turn reverses the direction of travel of belt 249. As will be recognized by those skilled in the art, belt 249 presses tape 240 against wheel 259 during the tensioning cycle. Because belt 249 contacts a significant length of tape as it travels around wheel 259 (i.e., greater than 12 the circumference of the wheel), the belt maintains a strong frictional grip on the tape and may thereby adequately tension the looped tape without any slippage thereof.

As shown, wheels 257 and 259 are rotatable within belt housing 253, but are not capable of any displacement with respect thereto. Wheel 261, however, is preferably spring loaded in a direction $R_1$ (i.e., the direction of tape travel) to maintain proper tension in the belt drive. In this regard, slot 269 in drive housing 253 and slot 271 in cover 255 are elongated to allow movement of wheel 261 in the direction of tape travel. Finally, when cover 255 is assembled to drive housing 253, guide channels 265, 267 are enclosed within drive housing 253.

Figure 24:
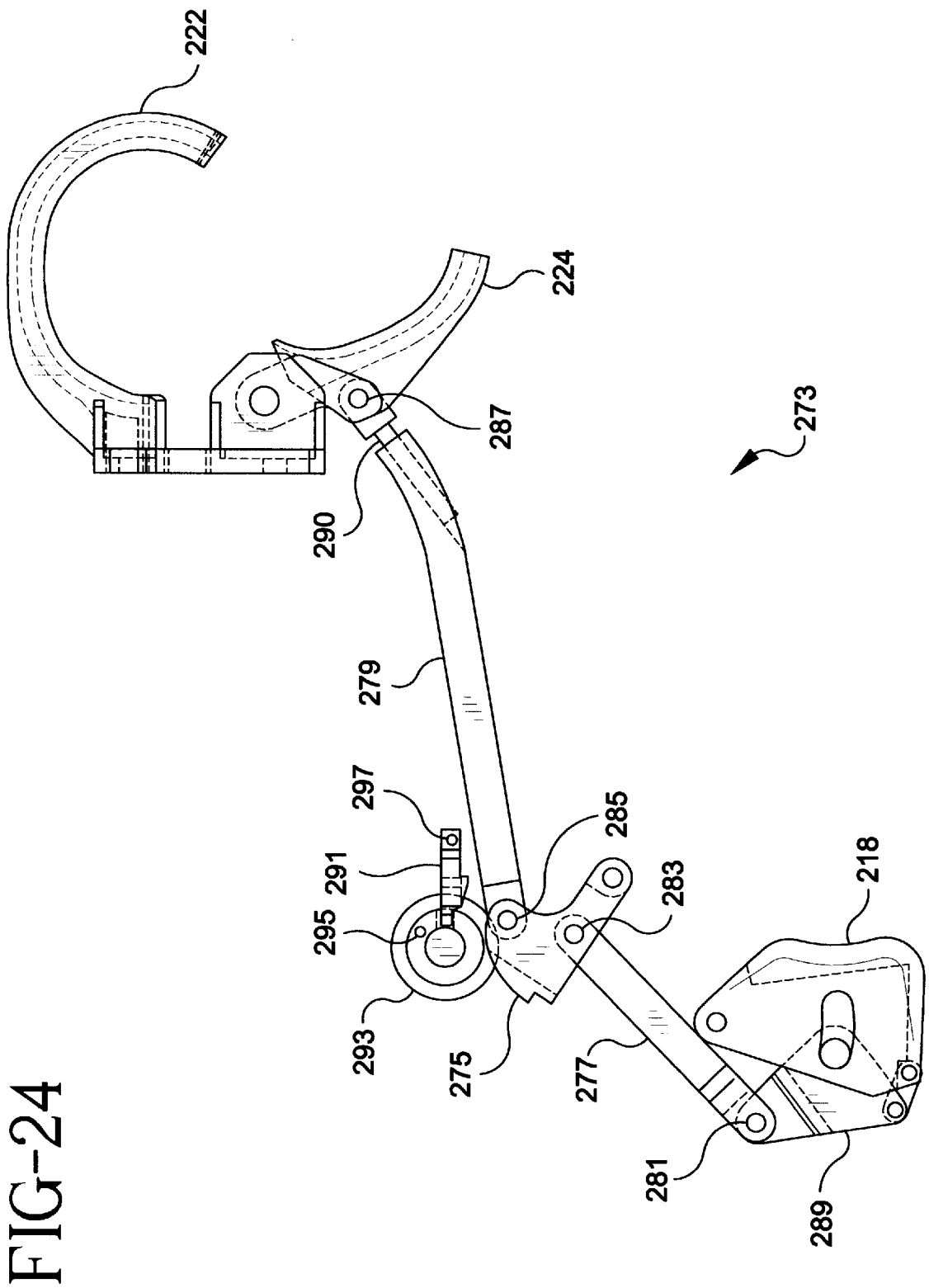
FIGS. 24–25 are enlarged details of the jaw actuating assembly of the tool of FIG. 19.
Figure 25:
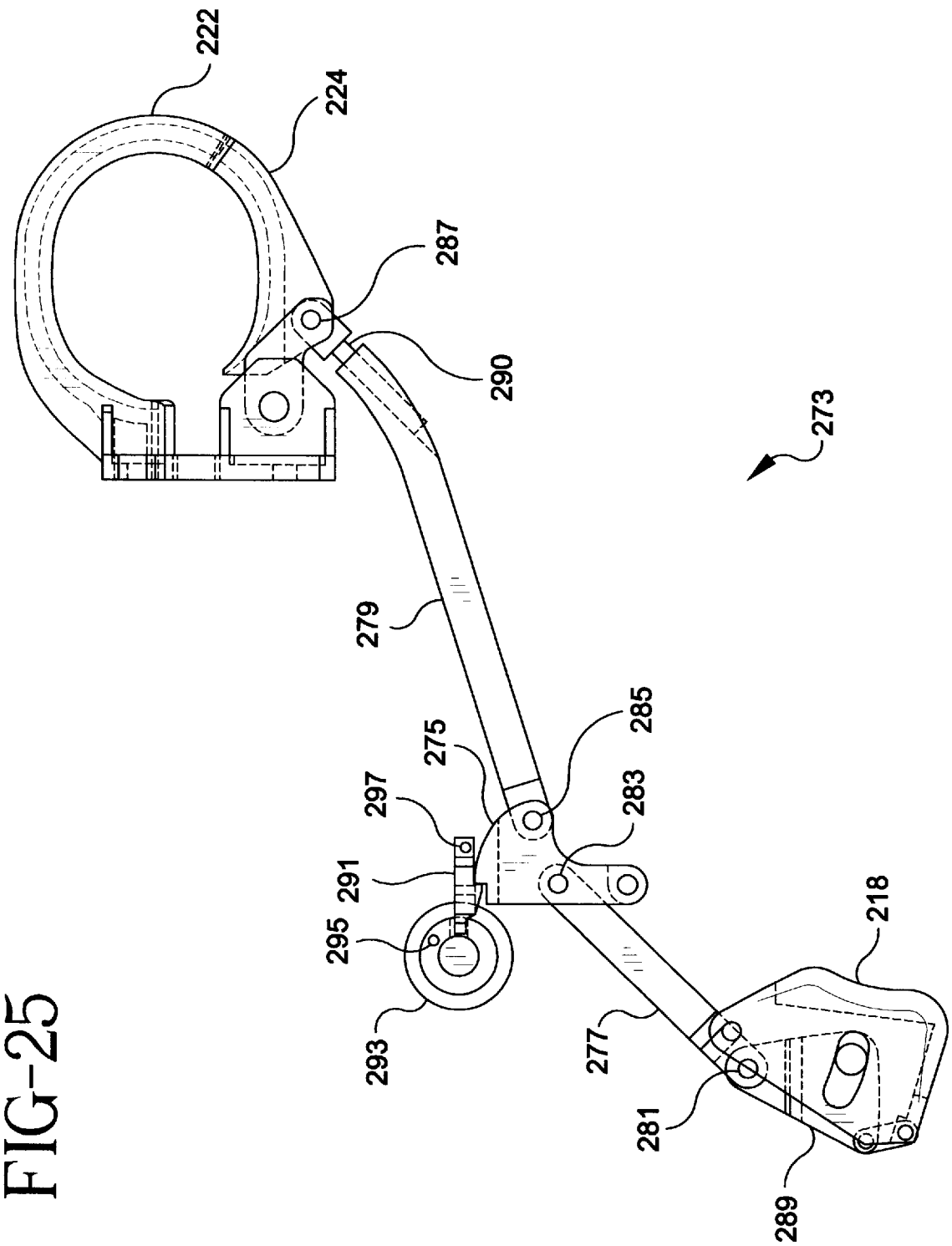

Referring now to FIGS. 24–25, tool 200 also includes an improved jaw actuating assembly 273. Assembly 273 includes control linkage 275, control rod 277 and control rod 279. Control rod 277 has first and second ends 281, 283, respectively, while control rod 279 has first and second ends 285, 287, respectively. As shown, first end 281 of rod 277 is connected to trigger 218 via linkage 289, while second end 283 of rod 277 is pivotally connected to control linkage 275. First end 285 of rod 279 is also pivotally connected to control linkage 275, while second end 287 of rod 279 is pivotally connected to lower movable jaw 224. Second end 287 of rod 287 preferably includes an adjustable link 290 to facilitate assembly of rod 278 to moveable jaw 224.

Control linkage 275 is moveably mounted with respect to the tool housing 212, and is movable between a first position (as shown in FIG. 24) and a second position (as shown in FIG. 25). Control linkage 275 is normally biased to the orientation shown in FIG. 24. Referring to FIG. 24, trigger 218 is shown in a standby position (i.e., non-actuated) and lower movable jaw 224 is shown in an open position in FIG. 24. Upon actuation of trigger 218 (as shown in FIG. 25), linkage 289 moves rod 277, causing control linkage 275 to pivot, which moves rod 279, and in turn moves lower jaw 224 to the closed position. Inasmuch as control linkage 275 is biased to the orientation shown in FIG. 24, releasing of trigger 218 would normally result in the reopening of lower jaw 224.

To hold jaw 224 closed during the cycling of the tool (without the need to keep trigger 218 depressed), assembly 273 further includes a locking pawl 291 which engages control linkage 275 when linkage 275 is pivoted to the orientation shown in FIG. 25. As a result, lower jaw 224 remains in its closed position even after trigger 218 is released. Assembly 273 also includes a release mechanism which includes a gear 293 and a release tab 295. Gear 293 is rotated counter-clockwise as the tool is cycled through the bundling operation. During this period, pawl 291 holds linkage 275 in the orientation of FIG. 25 whereby jaw 224 is held closed. Gear 293 is synchronized with the tool so that upon completion of the bundling operation, release tab 295 contacts pawls 291, thereby pivoting pawl 291 clockwise about point 297. Upon pivoting of pawl 291, the biasing force applied to control linkage 275 causes linkage 275 to return to the orientation of FIG. 24, whereby jaw 224 is moved to the open position to allow the previously bundled elongate articles to be removed from the jaws. The tool is then ready for its next bundling cycle.

Thus, upon placement of a plurality of elongate articles within jaw assembly 220, trigger 218 is actuated and then released. The actuation of trigger 218 moves lower jaw 224 to its closed position. Lower jaw 224 is held in its closed position by pawl 291 until the bundling operation has been completed (i.e., the tape has been looped about the articles, welded and severed from the supply roll), at which point release tab 295 pivots pawl 291 to allow lower jaw 224 to open whereby the bundled articles are removed. Jaw actuating assembly 273 therefore eliminates the need for the tool operator to keep the trigger depressed during the bundling operation.

Figure 26:
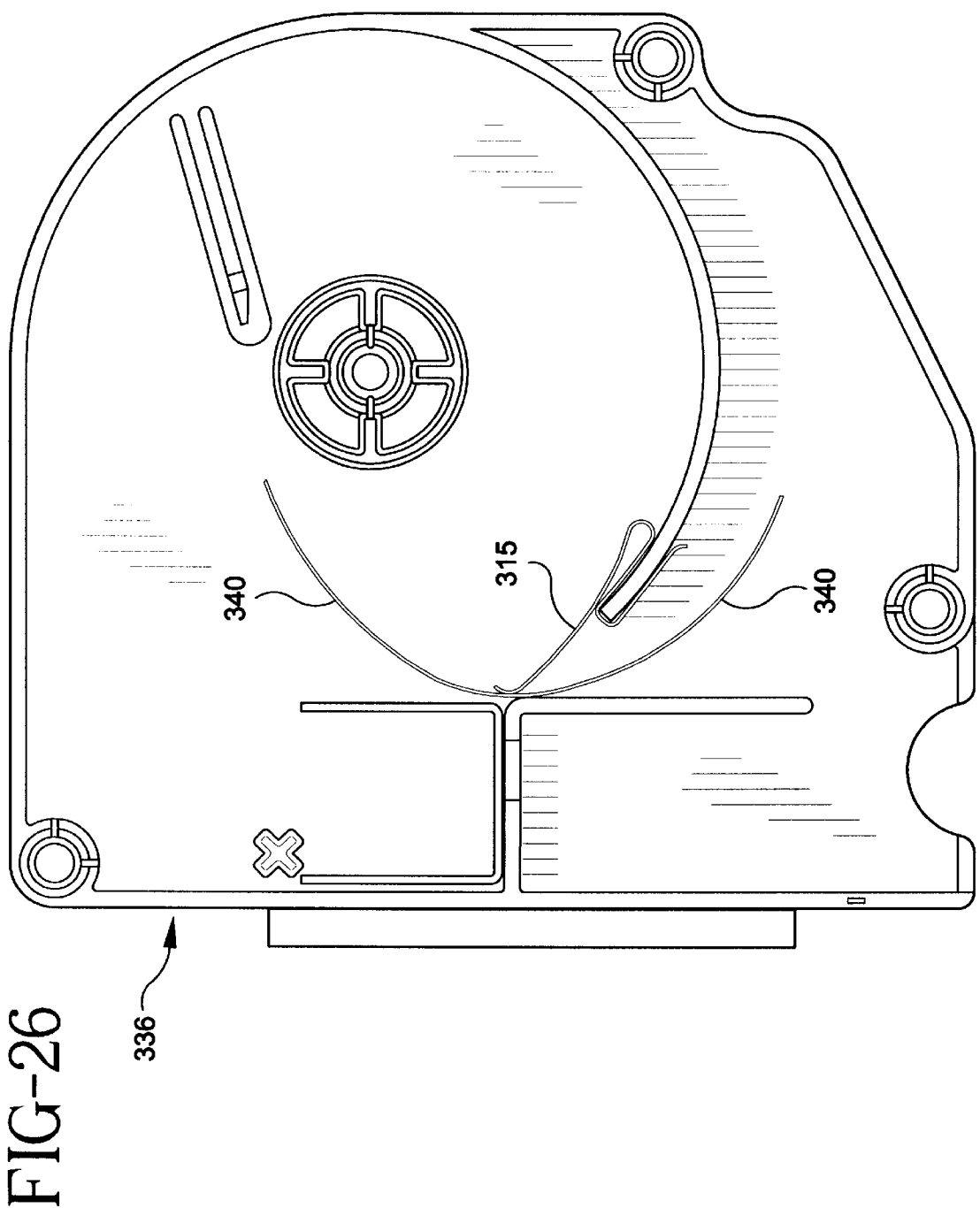
FIG. 26 is an enlarged detail of an alternative tape-supplying cartridge including a trap door.

In one preferred embodiment (as shown in FIG. 26), cartridge 336 includes a deflectable "trap door" 315. The cartridge is assembled so that a weldable tape 340 contained therein initially extends between trap door 315 and the adjacent wall of the cartridge. Once the entire length of tape contained within the cartridge is depleted, the resilient trap door blocks access to the spool by bearing directly against the wall of the cartridge, thereby preventing replacement tape from being loaded into the cartridge in an unauthorized manner. As each cartridge is designed for disposable one-time use, the trap door precludes the reloading of the cartridge for a second unauthorized use. The trap door feature provides quality assurance by preventing used cartridges (which may be damaged or warn) from again being used in connection with the tool, such use potentially resulting in improper dispensing of tape and or damage to the tool.

Figure 27:
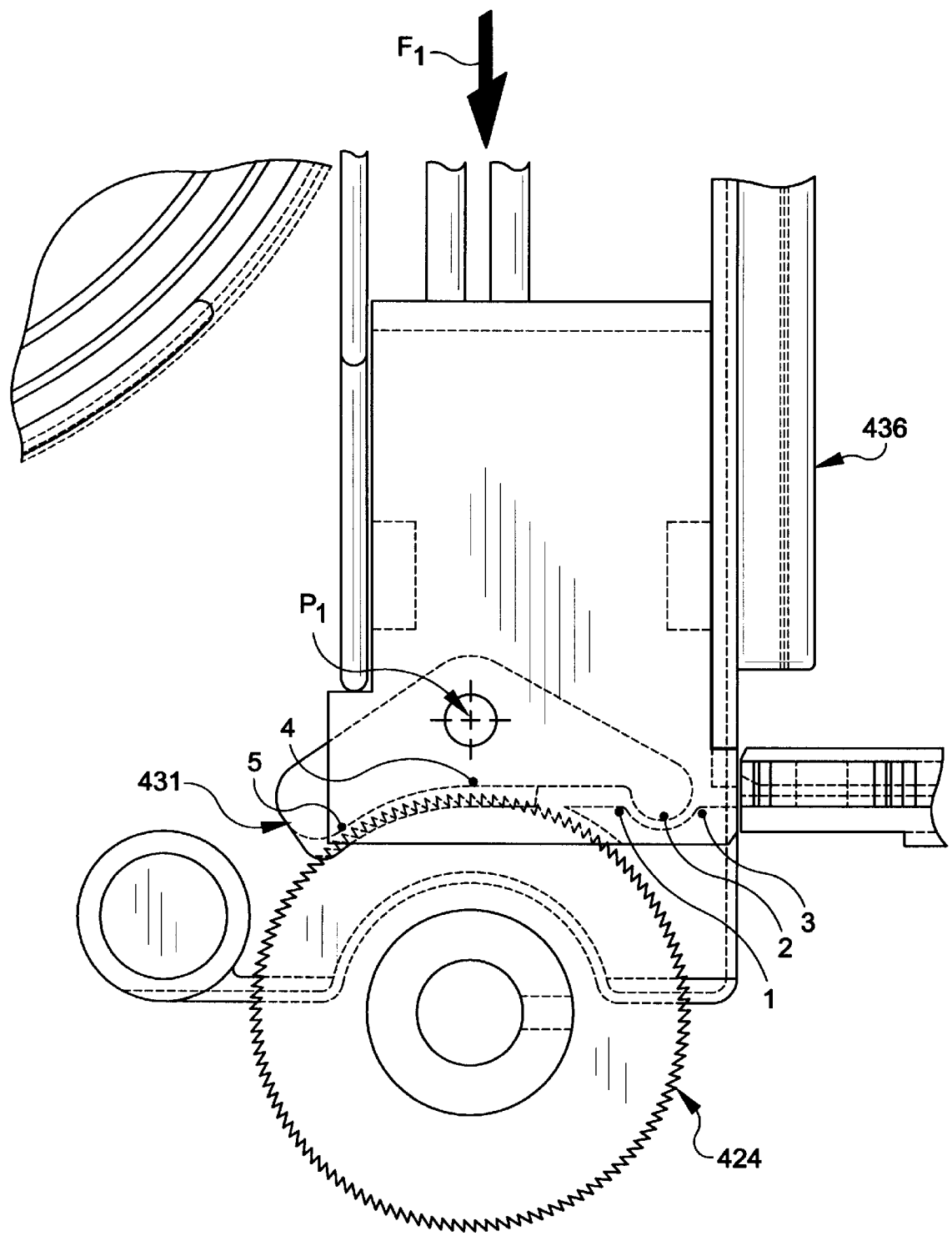
FIG. 27 is an enlarged detail of another alternative tape-supplying cartridge.

In another preferred embodiment (as shown in FIG. 27), the tool utilizes a cartridge 436. The weldable tape (not shown) is held in contact with drive wheel 424 by a spring-loaded arch shaped pad 431. The spring-loaded arch shaped pad forces the tape to follow the circumference of the drive wheel 424 from point (4) for some arc length to point (5) rather than just tangential. As a result, the tape is in contact with approximately ten teeth on the drive wheel as it passes between the drive wheel and the spring-loaded arch shaped pad. The normal force on the tape and drive wheel from the pad between points (4) and (5) has two components. The first component is from a spring force $F_1$ and is constant. The second component is a variable force generated by the tension in the tape. During the tensioning portion of the cycle, drive wheel 424 rotates counterclockwise (as viewed in FIG. 27) and the tape follows an offset path defined by points (3), (2), and (1) respectively. Points (1) and (3) are fixed relative to point (2). As all the slack is removed from the tape and it tightens around the bundle, the tape attempts to straighten its path between points (3) and (1). This straightening action imparts a reaction force at point (2) on the arch shaped pad causing its rotation about point $P_1$ and subsequent increase in normal force between points (4) and (5). The magnitude of additional normal force is directly proportional to the tension in the tape.

Figure 28:
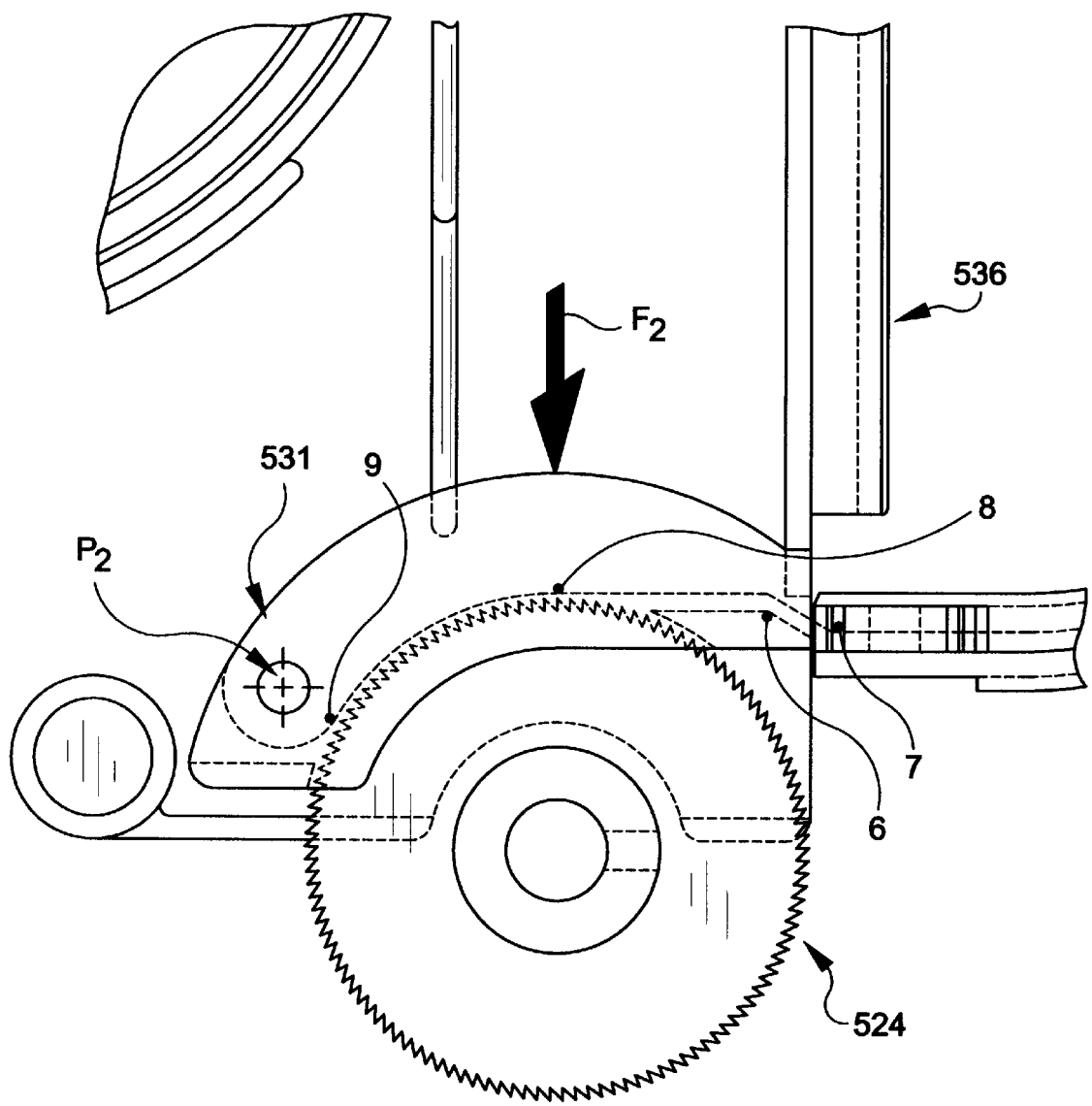
FIG. 28 is an enlarged detail of still another alternative tape-supplying cartridge.

In still another preferred embodiment (as shown in FIG. 28), the tool utilizes a cartridge 536. A pivotally mounted arch shaped pad 531 forces the strap into contact with the teeth of the drive wheel from point (8) for some arch length to point (4). In this regard, pad 531 is pivotable about point $P_2$. A normal force $F_2$ is effected by a spring in this zone. A large diameter drive wheel 524 is used which yields a longer arc length of contact between strap and drive wheel and results in approximately twenty teeth driving the strap. The automatic tensioning feature is actuated similarly by tension in the tape, as it follows the offset path defined by points (7) and (8). The tape will tend to straighten as the tension increases which imparts a reaction force on the back-up pad at point (6). Likewise, the magnitude of additional normal force is directly proportional to the tape tension.

Figure 29:
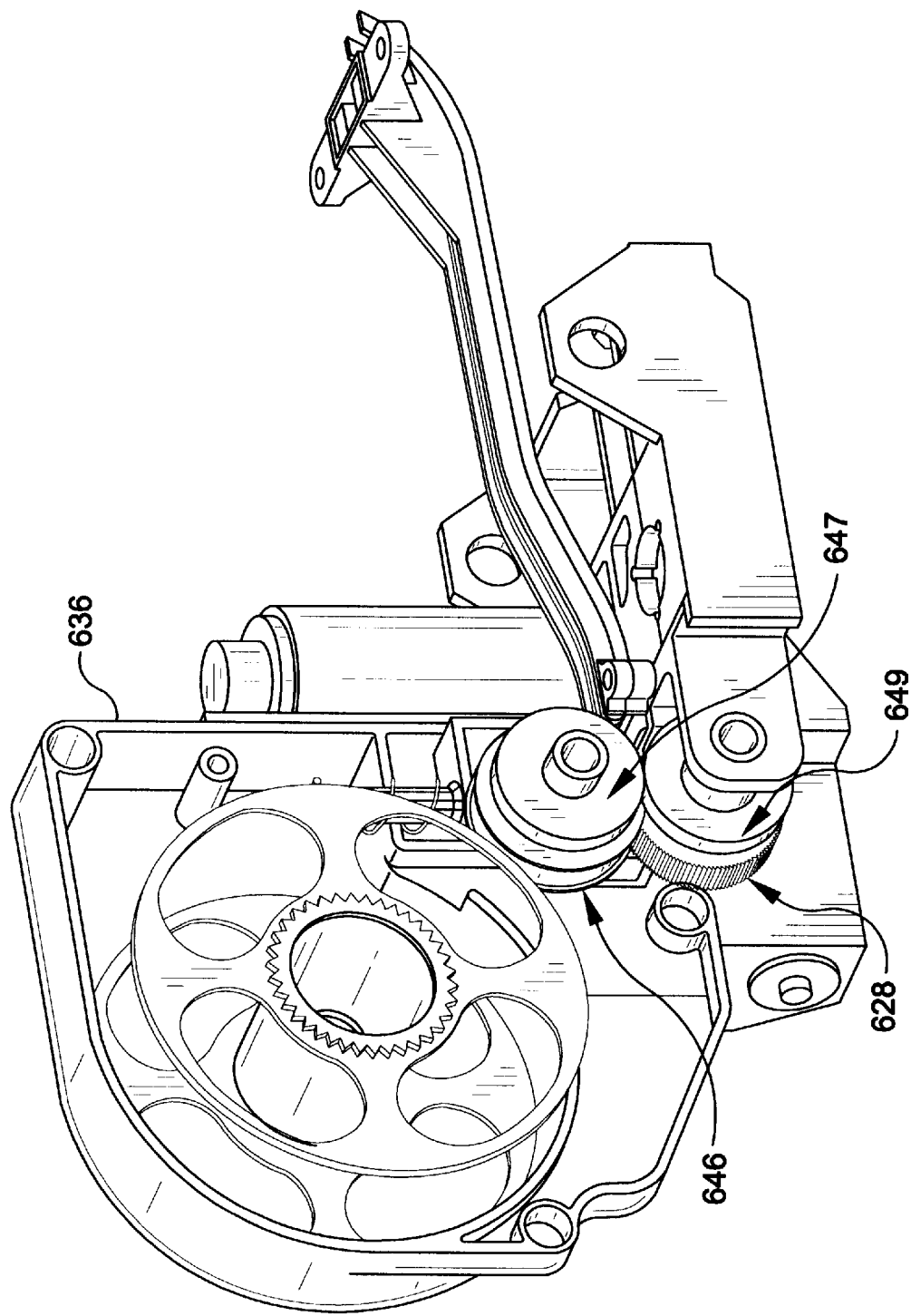
FIG. 29 is an enlarged perspective view of an alternative tape drive mechanism.

In a still further embodiment (as shown in FIG. 29), the tool utilizes a cartridge 636. The cartridge includes a spring loaded idler wheel 646 which cooperates with drive wheel 628 to advance the tape. Idler wheel 646 includes gear 647 which engages gear 649, gear 649 being driven in unison with drive wheel 628. As a result, idler wheel 646 becomes an active part of the tape drive system. Additional grip on tape is accomplished because both surfaces of the tape are in contact with positively driven wheels.

Figure 30:
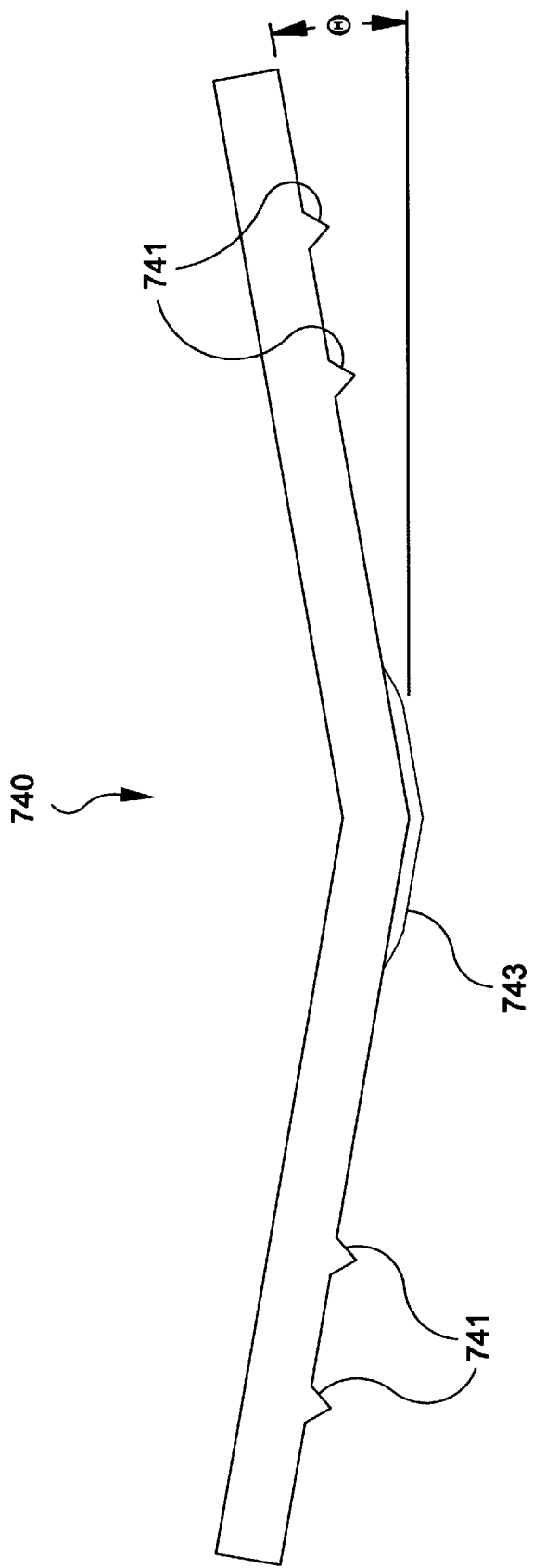
FIG. 30 is an enlarged cross-section of a V-shaped weldable tape.

In one preferred embodiment, the tool of the present invention utilizes a V-shaped weldable tape. As shown in FIG. 30, tape 740 has a V-shaped cross-section wherein θ is from about 5° to 20°, and preferably about 10°. Tape 740 preferably includes a pair of ultrasonic directors 741 located on each side of the tape. The directors decrease the time necessary to effect welding, while the positioning of the directors facilitate the location of the welds (see FIG. 12). It will be appreciated that the V-shaped cross-section facilitates guiding of the tape about the jaws of the tool inasmuch as it causes self-centering of the overlapped tape once such tape has been looped about the elongate article to be bundled. The V-shaped cross-section also increases the resistance of the tape to buckling as the tape is advanced through the tool. In addition, tape 740 may include an elastomeric material 743 on its article-contacting side which increases resistance to lateral sliding of the welded loop of the tape along the bundle of articles. The directors 741 may also provide additional resistance to lateral sliding in that they also contact and thereby grip the elongate articles in the bundle.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and or deviations be included within the scope of the followings claims.

What is claimed:

1. A method of bundling a plurality of elongate articles, comprising:

wrapping a weldable tape having a first free end about said article to form a loop of tape extending around said articles and beyond said first free end thereby providing an overlap of tape;

providing an ultrasonic welding tip for ultrasonic welding of said overlapped tape at a first location along said overlap;

welding said overlapped tape at said first location;

displacing said welding tip to a second location along said overlap; and cutting said tape at said second location to provide a second distal end and welding said second distal end to the underlying tape of said loop to secure said distal end thereto.

2. The method according to claim 1, wherein said ultrasonic welding tip is provided on a rotatably mounted ultrasonic horn; and further comprising the step of rotating said horn to displace said tip between said first and second locations.

3. The method according to claim 2, wherein said welding step at said first location includes the further step of providing a discontinuous weld across the width of said tape whereby tension may be retained in said loop during welding.

4. The method according to claim 2, further comprising the steps of providing a cutting edge positioned at said second location; and wherein said cutting step includes the further steps of applying ultrasonic energy to said tape and pressing said tape against said cutting edge.

5. The method according to claim 4, wherein said welding step at said second location includes the further step of providing a plurality of tack welds across the width of said tape to secure said second distal end to the underlying tape of said loop.

6. An ultrasonic tieing tool for applying a weldable tape about a bundle of elongate articles, comprising:

a housing including a body and a handle;

a jaw assembly cooperating with said body and configured to grasp said elongate articles whereby said tape may be looped about said articles;

an ultrasonic horn supported within said body and including a welding tip located proximate said jaw assembly;

at least one anvil located to cooperate with said welding tip and adapted for manipulating a portion of said weldable tape bearing thereagainst; and wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

7. The tool in accordance with claim 6, wherein said ultrasonic horn is rotatably mounted to said housing whereby said welding tip is rotatable between said first and second locations.

8. The tool in accordance with claim 7, wherein said ultrasonic horn is rotatable about a point vertically displaced from an axis extending through said welding tip whereby rotation of said welding tip about said point produces substantially vertical movement with respect to said anvil.

9. The tool in accordance with claim 6, further comprising a pair of anvil arms each having a flexible hinge portion associated therewith, and wherein each of said anvil arms includes an anvil located on a distal end thereof for cooperating with said welding tip, said anvils including angled regions which cooperate with said welding tip to cause welding of said tape at the outer edges thereof without any associated welding at the center of said tape whereby tension may be maintained in said loop during welding of said tensioned loop.

10. The tool in accordance with claim 9, further comprising a clamping block located and configured to cooperate with said anvils during the bundling of said elongate articles.

11. The tool in accordance with claim 10, wherein said clamping block includes a surface having a plurality of teeth thereon, said teeth located to engage said tape bearing thereagainst and facilitate clamping of said tape thereto, said clamping block further including a cutting edge located to contact said tape when said welding tip is in said second location.

12. The tool in accordance with claim 6, further comprising a cartridge for supplying said tape, said cartridge being configured for removable attachment to said housing, said housing including a tape drive mechanism for affecting transfer of said tape from said cartridge to said jaw assembly.

13. The tool in accordance with claim 12, further comprising a drive wheel rotatably mounted to said housing, and wherein said cartridge includes a spring-loaded wheel positioned to cooperate with said drive wheel whereby tape may be advanced from said cartridge.

14. The tool in accordance with claim 13, wherein said cartridge includes a slack take-up region, and wherein said drive wheel may be reversibly driven to tension said loop thus causing said tape to be withdrawn into said slack take-up region of said cartridge.

15. An ultrasonic tieing tool for applying a weldable tape about a bundle of elongate articles, comprising:

a tool housing including a body and a handle;

a jaw assembly cooperating with said body and configured to grasp said elongate articles whereby said tape may be looped about said articles;

an ultrasonic horn supported within said body and including a welding tip located proximate said jaw assembly;

at least one anvil located to cooperate with said welding tip and adapted for manipulating a portion of said weldable tape bearing thereagainst; and a belt drive mechanism for advancing said tape to said jaw assembly and for tensioning said tape following looping of said tape about said articles, said mechanism including a drive belt and a drive housing surrounding at least a portion of said belt, said drive housing defining at least one guide channel for passage of said tape therethrough, and wherein said belt defines at least one wall of said passage and wherein said passage is dimensioned to resist out-of-plane buckling of said tape as said tape is advanced therethrough.

16. The tool in accordance with claim 15, wherein said mechanism includes a drive wheel for turning said belt; and further comprising a spring loaded tape guide assembly located to cooperate with said drive wheel to facilitate advancement of said tape into said guide channel of said drive housing.

17. The tool in accordance with claim 16, wherein said guide assembly includes a wheel housing and a pinch wheel rotatably supported within said wheel housing, and wherein said wheel housing is biased towards said drive wheel so that said pinch wheel presses said tape against said drive belt.

18. The tool in accordance with claim 17, wherein said wheel housing includes a guide channel extending toward said pinch wheel to guide said tape between said pinch wheel and said belt and into said guide channel of said drive housing.

19. The tool in accordance with claim 18, further comprising a guide wheel located to orient said tape for advancement of said tape into said guide channel of said wheel housing.

20. The tool in accordance with claim 15, wherein said mechanism further includes a spring-loaded wheel for tensioning said belt and at least one tape gripping wheel for pressing of said tape thereagainst by said belt.

21. The tool in accordance with claim 15, wherein said mechanism includes another guide channel parallel to and laterally spaced from said at least one guide channel.

22. The tool in accordance with claim 21, wherein said guide channels define tape transfer spans which are oriented in a substantially horizontal orientation when said tool is oriented in a substantially upright orientation.

23. The tool in accordance with claim 15, wherein said jaw assembly includes at least one moveable jaw; and further comprising a trigger operatively connected to said movable jaw, said trigger being mounted on said handle and moveable between a standby position and an actuated position.

24. The tool in accordance with claim 23, further comprising a control linkage movably mounted with respect to said tool housing and movable between a first position and a second position; and further comprising first and second control rods having first and second ends respectively, said first rod extending between said trigger and said linkage whereby movement of said trigger from said standby position to said actuated position causes said first rod to pivot said linkage from said first position to said second position, said second rod extending between said linkage and said movable jaw whereby pivoting of said linkage from said first position to said second position causes said second rod to move said movable jaw from an open position to a closed position, and wherein said linkage is biased to said first position; and further comprising a locking mechanism for holding said linkage in said second position following actuation of said trigger; and further comprising a release mechanism for releasing said locking mechanism following welding of said tape about said articles whereby said linkage pivots to said first position causing said second rod to move said movable jaw to said open position.

25. The tool in accordance with claim 15, wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

26. The tool in accordance with claim 25, wherein said ultrasonic horn is rotatably mounted to said housing whereby said welding tip is rotatable between said first and second locations.

27. The tool in accordance with claim 26, wherein said ultrasonic horn is rotatable about a point vertically displaced from an axis extending through said welding tip whereby rotation of said welding tip about said point produces substantially vertical movement with respect to said anvil.

28. The tool in accordance with claim 15, further comprising a power supply and a control mechanism for powering and operating said tool.

29. An assembly, comprising:
an ultrasonic tieing tool; and
a tape supplying cartridge, said cartridge comprising:
   a cartridge housing configured to removably couple with said tool;
   a spool rotatably supported within said cartridge housing;
   a length of weldable tape carried on said spool for dispensing by said tool whereby a segment of weldable tape may be applied about a bundle of elongate articles; and
wherein said tool comprises:
   a tool housing including a body and a handle;
   a jaw assembly cooperating with said body and configured to grasp said elongate articles whereby said tape may be looped about said articles;
   an ultrasonic horn supported within said body and including a welding tip located proximate said jaw assembly;
   at least one anvil located to cooperate with said welding tip and adapted for manipulating a portion of said weldable tape bearing thereagainst; and
   a belt drive mechanism for advancing said tape to said jaw assembly and for tensioning said tape following looping of said tape about said articles, said mechanism including a drive belt and a drive housing surrounding at least a portion of said belt, said drive housing defining at least one guide channel for passage of said tape therethrough, and wherein said belt defines at least one wall of said passage and wherein said passage is dimensioned to resist out-of-plane buckling of said tape as said tape is advanced therethrough.

30. The assembly in accordance to claim 29, wherein said cartridge housing defines an internally-located slack take-up region for temporary storage of excess tape during tensioning of said tape about said articles.

31. The assembly in accordance with claim 30, wherein said cartridge further comprises an interiorly positioned trap door, said trap door configured and located to obstruct access to said spool following complete dispensing of said tape.

32. The assembly according to claim 30, wherein said cartridge further comprises a pinch wheel which cooperates with said belt drive mechanism to dispense said tape from said spool, and wherein said cartridge further includes a spring loaded pinch wheel housing, said pinch wheel rotatably supported within said pinch wheel housing.

33. The assembly according to claim 32, wherein said pinch wheel housing includes a guide channel for advancement of said tape to said pinch roller.

34. The assembly according to claim 30, wherein said tape is formed with a V-shaped cross-section to facilitate self-centering of said tape when looped about itself.

35. The assembly according to claim 34, wherein said tape includes ultrasonic directors positioned to facilitate welding about each edge of said tape.

36. The assembly according to claim 35, wherein said tape further includes an elastomeric material located on an article-contacting side of said tape for providing additional grip on said bundled elongate articles.

37. The assembly in accordance with claim 30 wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

38. The assembly in accordance with claim 37, wherein said ultrasonic horn is rotatably mounted to said housing whereby said welding tip if rotatable between said first and second locations.

39. The assembly in accordance with claim 38, wherein said ultrasonic horn is rotatable about a point vertically displaced from an axis extending through said welding tip whereby rotation of said welding tip about said point produces substantially vertical movement with respect to said anvil.

40. An ultrasonic tieing tool for applying a weldable tape about a bundle of elongate articles, comprising:
   a housing including a body and a handle;
   a jaw assembly cooperating with said body and configured to grasp said elongate articles whereby said tape may be looped about said articles;
   an ultrasonic horn supported within said body and including a welding tip located proximate said jaw assembly;
   at least one anvil located to cooperate with said welding tip and adapted for manipulating a portion of said weldable tape bearing thereagainst;
   a tape drive mechanism for advancing said tape to said jaw assembly and for tensioning said tape following looping of said tape about said articles, wherein said jaw assembly includes at least one moveable jaw;
   a trigger operatively connected to said movable jaw, said trigger being mounted on said handle and moveable between a standby position and an actuated position;
   a control linkage movably mounted with respect to said tool housing and movable between a first position and a second position;

first and second control rods having first and second ends respectively, said first rod extending between said trigger and said linkage whereby movement of said trigger from said standby position to said actuated position causes said first rod to pivot said linkage from said first position to said second position, said second rod extending between said linkage and said movable jaw whereby pivoting of said linkage from said first position to said second position causes said second rod to move said movable jaw from an open position to a closed position, and wherein said linkage is biased to said first position;

a locking mechanism for holding said linkage in said second position following actuation of said trigger; and a release mechanism for releasing said locking mechanism following welding of said tape about said articles whereby said linkage pivots to said first position causing said second rod to move said movable jaw to said open position.

41. The tool in accordance with claim 40, wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

42. The tool in accordance with claim 41, wherein said ultrasonic horn is rotatably mounted to said housing whereby said welding tip if rotatable between said first and second locations.

43. The tool in accordance with claim 42, wherein said ultrasonic horn is rotatable about a point vertically displaced from an axis extending through said welding tip whereby rotation of said welding tip about said point produces substantially vertical movement with respect to said anvil.

44. An ultrasonic tieing tool for applying a weldable tape about a bundle of elongate articles, comprising:

a tool housing including a body and a handle;

a jaw assembly cooperating with said body and configured to grasp said elongate articles whereby said tape may be looped about said articles;

an ultrasonic horn supported within said body and including a welding tip located proximate said jaw assembly;

at least one anvil located to cooperate with said welding tip and adapted for manipulating a portion of said weldable tape bearing thereagainst; and a tape drive mechanism for advancing said tape to said jaw assembly and for tensioning said tape following looping of said tape about said articles, said mechanism including a drive wheel and a cooperating spring loaded pad for gripping said tape extending therebetween, and wherein said pad is pivotable between a tape feeding position and a tape tensioning position, and wherein said pad is configured to pivot to said tape tensioning position upon increase of tension in said tape.

45. The tool in accordance with claim 44, wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

46. The tool in accordance with claim 45, wherein said ultrasonic horn is rotatably mounted to said housing whereby said welding tip if rotatable between said first and second locations.

47. The tool in accordance with claim 46, wherein said ultrasonic horn is rotatable about a point vertically displaced from an axis extending through said welding tip whereby rotation of said welding tip about said point produces substantially vertical movement with respect to said anvil.

48. An ultrasonic tieing tool for applying a weldable tape about a bundle of elongate articles, comprising:

a tool housing including a body and a handle;

a jaw assembly cooperating with said body and configured to grasp said elongate articles whereby said tape may be looped about said articles;

an ultrasonic horn supported within said body and including a welding tip located proximate said jaw assembly;

at least one anvil located to cooperate with said welding tip and adapted for manipulating a portion of said weldable tape bearing thereagainst; and a tape drive mechanism for advancing said tape to said jaw assembly and for tensioning said tape following looping of said tape about said articles, said mechanism including a pair of cooperating wheels for advancement of said tape therebetween, each of said wheels being directly driven by said tool whereby increased gripping of said tape by said wheels is accomplished.

49. The tool in accordance with claim 48, wherein said welding tip is displaceable between a first location wherein said welding tip is positioned to weld said tape thus securing said tape about said elongate articles and a second location wherein said welding tip is displaced a distance from said first location and positioned to effect cutting of said tape and tack welding of the resultant cut end to the underlying tape of said loop.

50. The tool in accordance with claim 49, wherein said ultrasonic horn is rotatably mounted to said housing whereby said welding tip if rotatable between said first and second locations.

51. The tool in accordance with claim 50, wherein said ultrasonic horn is rotatable about a point vertically displaced from an axis extending through said welding tip whereby rotation of said welding tip about said point produces substantially vertical movement with respect to said anvil.

* * * * *

UNITED STATES PATENT AND TRADEMARK OFFICE
CERTIFICATE OF CORRECTION

PATENT NO. : 6,136,118
DATED : October 24, 2000
INVENTOR(S) : Batholomew et al.

It is certified that error appears in the above-identified patent and that said Letters Patent is hereby corrected as shown below:

Column 5,
Line 43, "platform 30 for supporting" should be -- platform 30 for supporting --;

Column 11,
Line 64, "greater than 12 the circumference" should be -- greater than ½ the circumference --.

Signed and Sealed this

Tenth Day of January, 2006

JON W. DUDAS
*Director of the United States Patent and Trademark Office*